(12) United States Patent
Roy et al.

(10) Patent No.: US 11,120,229 B2
(45) Date of Patent: Sep. 14, 2021

(54) NATURAL LANGUAGE PROCESSING USING JOINT TOPIC-SENTIMENT DETECTION

(71) Applicant: OPTUM TECHNOLOGY, INC., Eden Prairie, MN (US)

(72) Inventors: Suman Roy, Bangalore (IN); Siddhartha Asthana, Ghaziabad (IN); Anurag Miglani, Panipat (IN); Sumit Jindal, Delhi (IN); Surajit Das, Noida (IN); Ashish Chaturvedi, Noida (IN)

(73) Assignee: OPTUM TECHNOLOGY, INC., Eden Prairie, MN (US)

( * ) Notice: Subject to any disclaimer, the term of this patent is extended or adjusted under 35 U.S.C. 154(b) by 177 days.

(21) Appl. No.: 16/560,304

(22) Filed: Sep. 4, 2019

(65) Prior Publication Data

US 2021/0064703 A1    Mar. 4, 2021

(51) Int. Cl.
*G06F 40/30* (2020.01)

(52) U.S. Cl.
CPC .................. *G06F 40/30* (2020.01)

(58) Field of Classification Search
CPC .............. G06F 40/30; G06F 40/284
See application file for complete search history.

(56) References Cited

U.S. PATENT DOCUMENTS

| | | | |
|---|---|---|---|
| 7,788,264 | B2 | 8/2010 | Zhu et al. |
| 8,234,274 | B2 | 7/2012 | Guo et al. |
| 8,356,086 | B2 | 1/2013 | Liu et al. |
| 8,515,879 | B2 | 8/2013 | Huh et al. |
| 8,682,649 | B2 | 3/2014 | Bellegarda |
| 8,719,302 | B2 | 5/2014 | Bailey et al. |
| 9,424,299 | B2 | 8/2016 | Bufe et al. |
| 9,501,525 | B2 | 11/2016 | Barker et al. |
| 10,055,479 | B2 | 8/2018 | Clinchant et al. |

(Continued)

FOREIGN PATENT DOCUMENTS

| | | |
|---|---|---|
| CN | 104199829 A | 12/2014 |
| CN | 108681557 A | 10/2018 |
| CN | 110390014 A | 10/2019 |

OTHER PUBLICATIONS

"sklearn.decomposition.LatentDirichletAllocation," (5 pages). [Online]. [Retrieved from the Internet Jan. 1, 2021] <https://scikit-learn.org/stable/modules/generated/sklearn.decomposition.LatentDirichletAllocation.html>.

(Continued)

*Primary Examiner* — Andrey Belousov
(74) *Attorney, Agent, or Firm* — Alston & Bird LLP

(57) ABSTRACT

There is a need for solutions for more effective and efficient natural language processing systems. This need can be addressed, for example, by a system configured to obtain a term correlation data object for a plurality of digital documents; determine, based at least in part on the term correlation data object, a term-topic correlation data object for the plurality of digital documents; determine, based at least in part on the term-topic correlation data object, a document-topic correlation data object for the plurality of digital documents; determine, based at least in part on the term-topic correlation data object, a document-sentiment correlation data object for the plurality of digital documents; generate the topic detection based at least in part on the document-topic correlation object; and generate the sentiment detection based at least in part on the document-sentiment correlation object.

20 Claims, 10 Drawing Sheets

(56) References Cited

U.S. PATENT DOCUMENTS

| | | |
|---|---|---|
| 10,216,724 B2 | 2/2019 | Sinha et al. |
| 2014/0280361 A1 | 9/2014 | Aliferis et al. |
| 2015/0052098 A1 | 2/2015 | Kveton et al. |
| 2017/0046601 A1 | 2/2017 | Chang et al. |
| 2017/0116204 A1 | 4/2017 | Davaleu et al. |
| 2018/0357302 A1 | 12/2018 | Qi et al. |

OTHER PUBLICATIONS

"Topic Modelling for Humans," GENISM, (6 pages), [online]. [Retrieved from the Internet Dec. 30, 2020] <https://radimrehurek.com/gensim/>.

Alsumait, Loulwah et al. "On-line LDA: Adaptive Topic Models for Mining Text Streams With Applications to Topic Detection and Tracking," In 2008 Eighth IEEE International Conference on Data Mining, Dec. 15, 2008, (pp. 3-12). IEEE.

Blei, David M. et al. "Dynamic Topic models," In Proceedings of the 23rd International Conference on Machine Learning, Jun. 25, 2006. pp. 113-120.

Bottou, Leon. "Stochastic Learning," In O. Bousquet et al. (EDS) Advanced Lectures on Machine Learning 2003. Lecture Notes in Computer Science, vol. 3176, (2004), pp. 146-168. Springer, Berlin, Heidelberg. DOI:10.1007/978-3-540-28650-9_7.

Bucak, Serhat S. et al. "Incremental Subspace Learning via Non-Negative Matrix Factorization," Pattern Recognition, vol. 42, Issue 5, (2009), pp. 788-797. ISSN 0031-3203. DOI: 10.1016/j.patcog.2008.09.002.

Cao, Bin et al. "Detect and Track Latent Factors with Online Nonnegative Matrix Factorization," In Proceedings of IJCAI, vol. 7, Jan. 6, 2007, pp. 2689-2694.

Chen, Guan-Bin et al. "Word Co-Occurrence Augmented Topic Model in Short Text," Computational Linguistics and Chinese Language Processing, vol. 20, No. 2, Dec. 2015, pp. 45-64.

Choo, Jaegul et al. "Utopian: User-Driven Topic Modeling Based on Interactive Nonnegative Matrix Factorization." IEEE Transactions on Visualization and Computer Graphics, vol. 19, No. 12, Dec. 13, pp. 1992-2001.

Guan, Naiyang et al. "Online Nonnegative Matrix Factorization With Robust Stochastic Approximation," IEEE TransACTIONS on Neural Networks and Learning Systems, vol. 23, No. 7, Jul. 2012, pp. 1087-1099.

Hoffman, Matthew D. et al. "Online Learning for Latent Dirichlet Allocation," In: Advances in Neural Information Processing Systems, vol. 23, (9 pages), 24th Annual Conference on Neural Information Processing Systems, Proceedings of a Meeting Held Dec. 6-9, 2010.

Iwata, Tomoharu et al. "Online Multiscale Dynamic Topic Models," In Proceedings of the 16th ACM SIGKDD International Conference on Knowledge Discovery and Data Mining, (2010), (10 pages).

Kim, Hyunsoo et al. "Non-Negative Matrix Factorization Based on Alternating Non-Negativity Constrained Least Squares and Active Set Method," SIAM Journal on Matrix Analysis and Applications, vol. 30, No. 2, (2008), (16 pages).

Kim, Jingu et al. "Algorithms for Non-Negative Matrix and Tensor Factorizations: A Unified View Based on Block Coordinate Descent Framework," Journal of Global Optimization, No. 58, No. 2, (2014), pp. 285-319. DOI: 10.1007/s10898-013-0035-4.

Kim, Jingu et al. "Fast Non-Negative Matrix Factorization: An Active-Set-Like Method and Comparisons," SIAM Journal on Scientific Computing, vol. 33, No. 6, (2011), (21 pages).

Leskovec, Jure et al. "Mining of Massive Datasets," 2nd Edition, Tanagra Data Mining, Cambridge University Press (2014), pp. '1-16.

Li, Chenliang et al. "Topic Modeling for Short Texts With Auxiliary Word Embedding," In Proceedings of the 39th International ACM SIGIR Conference on Research and Development in Information Retrieval, Jul. 7, 2016, pp. 165-174.

Lin, Chih-Jen. "Projected Gradient Methods for Non-Negative Matrix Factorization," Neural Computation, vol. 19, No. 10, Oct. 2007, (27 pages).

Nugroho, Robertus et al. "Deriving Topics in Twitter by Exploiting Tweet Interactions," In 2015 IEEE International Congress on Big Data, Jun. 27-Jul. 2, 2015, pp. 87-94. New York City, NY, USA. DOI: 10.1109/BigDataCongress.2015.22.

Qiang, Jipeng et al. "Topic Modeling Over Short Texts by Incorporating Word Embeddings," arXiv: 1609.08496v1 [cs.CL] Sep. 27, 2016, (10 pages). DOI: 10.1145/1235. ACM ISBN: 9781-4503-2138-9.

Quan, Xiaojun et al. "Short and Sparse Text Topic Modeling via Self-Aggregation," In Proceedings of the 24th International Conference on Artificial Intelligence, IJCAI 2015, AAAI Press (2015), 2270-2276.

Röder, Michael et al. "Exploring the Space of Topic Coherence Measures," In Proceedings of the Eighth ACM International Conference on Web Search and Data Mining, WSDM 2015, ACM (2015), pp. 399-408.

Roy, Suman et al. "A NMF-Based Learning of Topics and Clusters for IT Maintenance Tickets Aided by Heuristic," In Information Systems in the Big Data Era—CAiSE Forum 2018, Proceedings, (2018), LNBIP 317, pp. 209-217. DOI: 10.1007/978-3-319-92901-9_18.

Sasaki, Kentaro et al. "Online Topic Model for Twitter Considering Dynamics of User Interests and Topic Trends," In Proceedings of the 2014 Conference on Empirical Methods in Natural Language Processing (EMNLP), Oct. 2014, pp. 1977-1985.

Shi, Tian et al. "Short-Text Topic Modeling via Non-Negative Matrix Factorization Enriched With Local Word-Context Correlations," In Proceedings of the 2018 World Wide Web Conference, Apr. 10, 2018, pp. 1105-1114.

Tibshirani, Robert, "Regression Shrinkage and Selection via the Lasso," Journal of the Royal Statistical Society, Series B (Methodological), vol. 58, Issue 1, (1996), pp. 267-288.

Wang, Fei et al. "Efficient Document Clustering via Online Non-negative Matrix Factorizations," In Eleventh SIAM International Conference on Data Mining, Society for Industrial and Applied Mathematics, (SDM), (2011), pp. 908-919.

Wang, Fei et al. "Efficient Nonnegative Matrix Factorization With Random Projections," In Proceedings of the 2010 Society for Industrial and Applied Mathematics (SIAM) International Conference on Data Mining, Apr. 29, 2010, pp. 281-292.

Wang, Fei et al. "Two Heads Better Than One: Metric+Active Learning and Its Applications for IT Service Classification," The Ninth IEEE International Conference on Data Mining, (2009), pp. 1022-1027.

Wang, Xuerui et al. "Topics Over Time: A Non-Markov Continuous-Time Model of Topical Trends," In Proceedings of the 12th ACM SIGKDD International Conference on Knowledge Discovery and Data Mining, Aug. 20, 2006, pp. 424-433.

Xun, Guangxu et al. "Topic Discovery for Short Texts Using Word Embeddings," In IEEE 16th International Conference on Data Mining, ICDM'16, (2016), pp. 1299-1304. DOI: 10.1109/ICDM.2016.33.

Yan, Xiaohui et al. "Learning Topics in Short Texts by Non-Negative Matrix Factorization on Term Correlation Matrix," In Proceedings of the 2013 Society for Industrial and Applied Mathematics International Conference on Data Mining SIAM, May 2, 2013, pp. 749-757. [Retrieved from the Internet Jan. 1, 2021] <https://pdfs.semanticscholar.org/b5d0/36429877568a648389531e323ea0983a5148.pdf?_ga=2.157248957.700061297.1609543144-615072438.1609543144>.

Zhou, Guoxu et al. "Online Blind Source Separation Using Incremental Non-Negative Matrix Factorization With Volume Constraint," IEEE Transactions on Neural Networks, Apr. 2011, vol. 22, No. 4, pp. 550-560.

Zuo Yuan et al. "Topic Modeling of Short Texts: A Pseudo-Document View," In Proceedings of the 22nd ACM SIGKDD International Conference on Knowledge Discovery and Data Mining, Aug. 13, 2016, pp. 2105-2114.

(56) References Cited

OTHER PUBLICATIONS

"Deeply Moving: Deep Learning for Sentiment Analysis," (6 pages), [article], [online], [Retrieved from the Internet Dec. 18, 2019] <https://nlp.stanford.edu/sentiment/>.

"Sentiment Analysis," General Architecture for Text Engineering, (2 pages), [article], [online], [Retrieved from the Internet Dec. 18, 2019] <https://gate.ac.uk/applications/sentiment.html>.

"Sentiment Analysis," OpenText, (6 pages), [article], [online], [Retrieved from the Internet Dec. 18, 2019] <https://www.opentext.com/products-and-solutions/products/discovery/information-access-plafform/sentiment-analysis>.

"Tone Analyzer," IBM Watson, (10 pages), [online], [Retrieved from the Internet Dec. 19, 2019] <https://www.ibm.com/watson/services/tone-analyzed>.

26. W. Xu, X. Liu, and Y. Gong. Document Clustering Based on Non-Negative Matrix Factorization, In Proceedings of the 26th Annual International ACM SIGIR Conference on Research and Development in Information Retrieval, SIGIR '03, pp. 267-273, Jul. 28, 2003. ACM.

Alshari, Eissa et al. "Improvement of Sentiment Analysis Based on Clustering of Word2Vec Features," In 28th International Workshop on Database and Expert Systems Applications (DEXA), Aug. 29, 2017, pp. 123-126. IEEE.

Arbelaitz, Olatz et al. "An Extensive Comparative Study of Cluster Validity Indices," Pattern Recognition, vol. 46, No. 1, (2013), pp. 243-256.

Bagheri, Ayoub et al. "ADM-LDA: An Aspect Detection Model Based on Topic Modelling Using the Structure of Review Sentences," Journal of Information Science 2014, vol. 40, Issue 5, pp. 621-636.

Blei, David M. et al. "Latent Dirichlet Allocation," Journal of Machine Learning Research, vol. 3, (2003), pp. 993-1022.

Boyd-Graber, Jordan et al. "Holistic Sentiment Analysis Across Languages: Multilingual Supervised Latent Dirichlet Allocation," Proceedings of the 2010 Conference on Empirical Methods in Natural Language Processing, Oct. 9, 2010, pp. 45-55.

Ding, Chris et al. "Orthogonal Non-Negative Matrix Tri-Factorizations for Clustering," In Proceedings of the Twelfth ACM SIGKDD International Conference on Knowledge Discovery and Data Mining, Aug. 20, 2006, pp. 126-135.

Griffiths, Griffiths and M. Steyvers. Finding scientific topics. Proceedings of the National Academy of Sciences, Apr. 6, 2004, vol. 101, Suppl. 1, pp. 5228-5235.

HB, Barathi Ganesh et al. "Distributional Semantic Representation in Health Care Text Classification," 2016, (4 pages).

He, Zhaoshui et al. "Symmetric Nonnegative Matrix Factorization: Algorithms and Applications to Probabilistic Clustering." IEEE Transactions on Neural Networks, vol. 22, No. 12, Dec. 2011, pp. 2117-2131.

Hofmann, Thomas. "Probabilistic Latent Semantic Indexing," In SIGIR Forum, (1999), pp. 50-57, ACM.

Hu, Xia et al. "Unsupervised Sentiment Analysis With Emotional Signals," In Proceedings of the 22nd International Conference on World Wide Web May 13, 2013, pp. 607-618. ACM.

Keiningham, Timothy L. et al. "A Longitudinal Examination of Net Promoter and Firm Revenue Growth," Journal of Marketing, vol. 71, No. 3, Jul. 2007, pp. 39-51.

Kim, Soo-Min et al. "Determining the Sentiment of Opinions," In Proceedings of the 20th International Conference on Computational Linguistics Aug. 23, 2004, (7 pages), Association for Computational Linguistics.

Kuang, Da et al. "Nonnegative Matrix Factorization for Interactive Topic Modeling and Document Clustering," Springer International publishing Switzerland 2015, pp. 215-243. DOI: 10.1007/978-3-319-09259-1_7.

Lee, Daniel D. et al. "Algorithms for Non-Negative Matrix Factorization," In Advances in Neural Information Processing Systems 13, pp. 556-562, MIT Press, 2001. T.K. Leen, T.G. Dietterick, and V. Tresp, Editors.

Li, Tao et al. "A Non-Negative Matrix Tri-Factorization Approach to Sentiment Classification With Lexical Prior Knowledge." In Proceedings of the 47th Annual Meeting of the ACL and the 4th International Joint Conference on Natural Language Processing of the AFNLP, pp. 244-252, Aug. 2, 2009, Suntec, Singapore.

Li, Tao et al. "Knowledge Transformation From Word Space to Document Space," In Proceedings of the 31st Annual International ACM SIGIR'08, pp. 187-194, Jul. 20, 2008, Singapore.

Lin, Chenghua et al. "Joint Sentiment Topic Model for Sentiment Analysis," In Proceedings of the 18th ACM Conference on Information and Knowledge Management, CIKM '09, pp. 375-384, Nov. 2, 2009. ACM.

Liu, Bing et al. "Opinion Observer: Analyzing and Comparing Opinions on the Web," In Proceedings of the 14th International Conference on World Wide Web, WWW'05, pp. 342-351, May 10, 2005, Chiba, Japan.

Mei, Qiaozhu et al. "Automatic Labeling of Multinomial Topic Models," In Proceedings of the 13th ACM SIGKDD International Conference on Knowledge Discovery and Data Mining, pp. 490-499, Aug. 12, 2007, San Jose, California.

Mei, Qiaozhu et al. "Topic Sentiment Mixture: Modeling Facets and Opinions in Weblogs," In Proceedings of the 16th International Conference on World Wide Web, WWW'07, pp. 171-180, May 8, 2007, Banff, Alberta, Canada.

Mikolov, Tomas et al. "Efficient Estimation of Word Representations in Vector Space," pp. 1-12, arXiv: 1301.3781v3 [cs.CL], Sep. 7, 2013.

O'Hare, Neil et al. "Topic-Dependent Sentiment Analysis of Financial Blogs," In Proceedings of the 1st International CIKM Workshop on Topic-Sentiment Analysis for Mass Opinion Measurement, Nov. 6, 2009, pp. 9-16, Hong Kong, China. ACM.

Pang, Bo et al. "Opinion Mining and Sentiment Analysis," Foundations and Trends in Information Retrieval, vol. 2, No. 1-2, pp. 1-135, (2008).

Pang, Bo et al. "Thumbs Up? Sentiment Classification Using Machine Learning Techniques," In Proceedings of the 2002 Conference on Empirical Methods in Natural Language Processing (EMNLP), arXiv:cs/0205070v1 [cs.CL], May 28, 2002.

Poddar, Lahari et al. "Author-Aware Aspect Topic Sentiment Model to Retrieve Supporting Opinions From Reviews," In Proceedings of the 2017 Conference on Empirical Methods in Natural Language Processing, EMNLP'17, pp. 472-481, Sep. 7, 2017, Copenhagen, Denmark.

Rahman, Md Mustafizur et al. "Hidden Topic Sentiment Model," In Proceedings of the 25th International Conference on World Wide Web, WWW '16, pp. 155-165, Apr. 11, 2016, Montreal, Quebec, Canada.

Titov, Ivan et al. "A Joint Model of Text and Aspect Ratings for Sentiment Summarization," In Proceedings of ACL—08: HLT, pp. 308-316, Jun. 2008, Association for Computational Linguistics.

Turney, Peter D. "Thumbs Up or Thumbs Down? Semantic Orientation Applied to Unsupervised Classification of Reviews," In Proceedings of the 40th Annual Meeting of the Association for Computational Linguistics (ACL)'04, pp. 417-424, Jul. 6, 2002.

Waggoner, Alexander A. "Triple Non-Negative Matrix Factorization Technique for Sentiment Analysis and Topic Modeling," (2017), CMC Senior Theses.1550, Claremont McKenna College, (25 pages). [Retrieved from the Internet Dec. 18, 2019] <https://scholarship.claremon/edu/cmc.theses/1550/>.

Yan, Xiaohui et al. "Learning Topics in Short Texts by Non-Negative Matrix Factorization on Term Correlation Matrix," In Proceedings of the 13th SIAM International Conference on Data Mining, May 2, 2013, pp. 749-757, Society for Industrial and Applied Mathematics.

Zhao, Jun et al. "Adding Redundant Features for CRFs-Based Sentence Sentiment Classification," In Proceedings of the 2008 Conference on Empirical Methods in Natural Language Processing, EMNLP '08, pp. 117-126, Oct. 2008, Association for Computational Linguistics, Honolulu, Hawaii.

NATURAL LANGUAGE PROCESSING USING JOINT TOPIC-SENTIMENT DETECTION

BACKGROUND

Many existing natural language processing (NLP) systems face technical challenges in accurately and efficiently detecting reliable properties for relatively short NLP input data. One reason behind the noted technical challenges is that, because of their limited size, relatively short NLP data produce limited valuable input NLP feature data. Through ingenuity and innovation, various embodiments of the present invention make substantial improvements to efficiency and reliability of NLP systems, including by improving capabilities of NLP systems to address technical challenges in accurately and efficiently detecting reliable properties for relatively short NLP input data.

BRIEF SUMMARY

In general, embodiments of the present invention provide methods, apparatus, systems, computing devices, computing entities, and/or the like for NLP using sentiment detection. Certain embodiments utilize systems, methods, and computer program products that enable NLP by detecting joint sentiment-topic models for NLP input data.

In accordance with one aspect, a method is provided. In one embodiment, the method comprises obtaining, by one or more processors, a term correlation data object for a plurality of digital documents, wherein: (1) the term correlation data object comprises a plurality of term correlation indicators for a plurality of terms, and (2) the plurality of term correlation indicators describe co-occurrences of the plurality of terms in the plurality of digital documents; determining, by the one or more processors and based at least in part on the term correlation data object, a term-topic correlation data object for the plurality of digital documents, wherein: (1) the term-topic correlation data object comprises a plurality of term-topic correlation indicators, (2) the plurality of term-topic correlation indicators describe relationships between the plurality of terms and a plurality of topics, (3) the term-topic correlation data object is determined by a term-topic factorization of the term correlation data object into a plurality of inferred term-topic data objects, and (4) the plurality of inferred term-topic data objects comprises the term-topic correlation data object; determining, by the one or more processors and based at least in part on the term-topic correlation data object, a document-topic correlation data object for the plurality of digital documents, wherein: (1) the document-topic correlation data object comprises a plurality of document-topic correlation indicators, (2) the plurality of digital documents-topic correlation indicators describe relationships between the plurality of digital documents and a plurality of topics, (3) the document-topic correlation data object is determined by a document-topic factorization of a source term-document data object into a plurality of inferred document-topic data objects, and (4) the plurality of inferred document-topic data objects comprises the document-topic correlation data object; determining, by the one or more processors and based at least in part on the term-topic correlation data object, a document-sentiment correlation data object for the plurality of digital documents, wherein: (1) the document-sentiment correlation data object comprises a plurality of document-sentiment correlation indicators, (2) the plurality of digital documents-sentiment correlation indicators describe relationships between the plurality of digital documents and a plurality of sentiments, (3) the document-topic correlation data object is determined by a document-sentiment factorization of a source document-sentiment data object into a plurality of inferred document-sentiment data objects, and (4) the plurality of inferred document-topic data objects comprises the document-sentiment correlation data object; generating, by the one or more processors, the topic detection based at least in part on the document-topic correlation object; and generating, by the one or more processors, the sentiment detection based at least in part on the document-sentiment correlation object.

In accordance with another aspect, a computer program product is provided. The computer program product may comprise at least one computer-readable storage medium having computer-readable program code portions stored therein, the computer-readable program code portions comprising executable portions configured to obtain, by one or more processors, a term correlation data object for a plurality of digital documents, wherein: (1) the term correlation data object comprises a plurality of term correlation indicators for a plurality of terms, and (2) the plurality of term correlation indicators describe co-occurrences of the plurality of terms in the plurality of digital documents; determine, by the one or more processors and based at least in part on the term correlation data object, a term-topic correlation data object for the plurality of digital documents, wherein: (1) the term-topic correlation data object comprises a plurality of term-topic correlation indicators, (2) the plurality of term-topic correlation indicators describe relationships between the plurality of terms and a plurality of topics, (3) the term-topic correlation data object is determined by a term-topic factorization of the term correlation data object into a plurality of inferred term-topic data objects, and (4) the plurality of inferred term-topic data objects comprises the term-topic correlation data object; determine, by the one or more processors and based at least in part on the term-topic correlation data object, a document-topic correlation data object for the plurality of digital documents, wherein: (1) the document-topic correlation data object comprises a plurality of document-topic correlation indicators, (2) the plurality of digital documents-topic correlation indicators describe relationships between the plurality of digital documents and a plurality of topics, (3) the document-topic correlation data object is determined by a document-topic factorization of a source term-document data object into a plurality of inferred document-topic data objects, and (4) the plurality of inferred document-topic data objects comprises the document-topic correlation data object; determine, by the one or more processors and based at least in part on the term-topic correlation data object, a document-sentiment correlation data object for the plurality of digital documents, wherein: (1) the document-sentiment correlation data object comprises a plurality of document-sentiment correlation indicators, (2) the plurality of digital documents-sentiment correlation indicators describe relationships between the plurality of digital documents and a plurality of sentiments, (3) the document-topic correlation data object is determined by a document-sentiment factorization of a source document-sentiment data object into a plurality of inferred document-sentiment data objects, and (4) the plurality of inferred document-topic data objects comprises the document-sentiment correlation data object; generate, by the one or more processors, the topic detection based at least in part on the document-topic correlation object; and generate, by the one or more processors, the sentiment detection based at least in part on the document-sentiment correlation object.

In accordance with yet another aspect, an apparatus comprising at least one processor and at least one memory including computer program code is provided. In one embodiment, the at least one memory and the computer program code may be configured to, with the processor, cause the apparatus to obtain, by one or more processors, a term correlation data object for a plurality of digital documents, wherein: (1) the term correlation data object comprises a plurality of term correlation indicators for a plurality of terms, and (2) the plurality of term correlation indicators describe co-occurrences of the plurality of terms in the plurality of digital documents; determine, by the one or more processors and based at least in part on the term correlation data object, a term-topic correlation data object for the plurality of digital documents, wherein: (1) the term-topic correlation data object comprises a plurality of term-topic correlation indicators, (2) the plurality of term-topic correlation indicators describe relationships between the plurality of terms and a plurality of topics, (3) the term-topic correlation data object is determined by a term-topic factorization of the term correlation data object into a plurality of inferred term-topic data objects, and (4) the plurality of inferred term-topic data objects comprises the term-topic correlation data object; determine, by the one or more processors and based at least in part on the term-topic correlation data object, a document-topic correlation data object for the plurality of digital documents, wherein: (1) the document-topic correlation data object comprises a plurality of document-topic correlation indicators, (2) the plurality of digital documents-topic correlation indicators describe relationships between the plurality of digital documents and a plurality of topics, (3) the document-topic correlation data object is determined by a document-topic factorization of a source term-document data object into a plurality of inferred document-topic data objects, and (4) the plurality of inferred document-topic data objects comprises the document-topic correlation data object; determine, by the one or more processors and based at least in part on the term-topic correlation data object, a document-sentiment correlation data object for the plurality of digital documents, wherein: (1) the document-sentiment correlation data object comprises a plurality of document-sentiment correlation indicators, (2) the plurality of digital documents-sentiment correlation indicators describe relationships between the plurality of digital documents and a plurality of sentiments, (3) the document-topic correlation data object is determined by a document-sentiment factorization of a source document-sentiment data object into a plurality of inferred document-sentiment data objects, and (4) the plurality of inferred document-topic data objects comprises the document-sentiment correlation data object; generate, by the one or more processors, the topic detection based at least in part on the document-topic correlation object; and generate, by the one or more processors, the sentiment detection based at least in part on the document-sentiment correlation object.

BRIEF DESCRIPTION OF THE DRAWINGS

Figure 1:
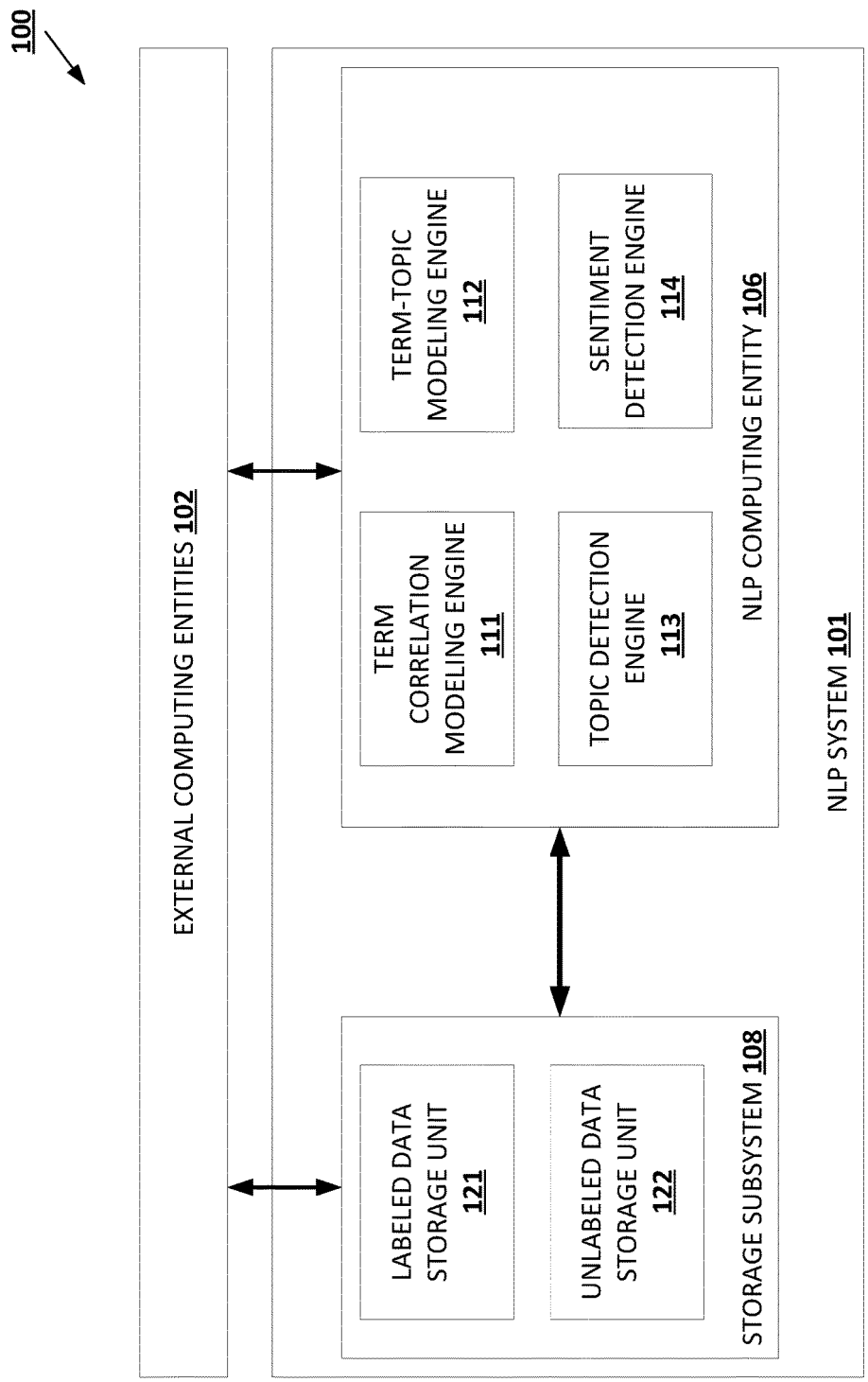

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
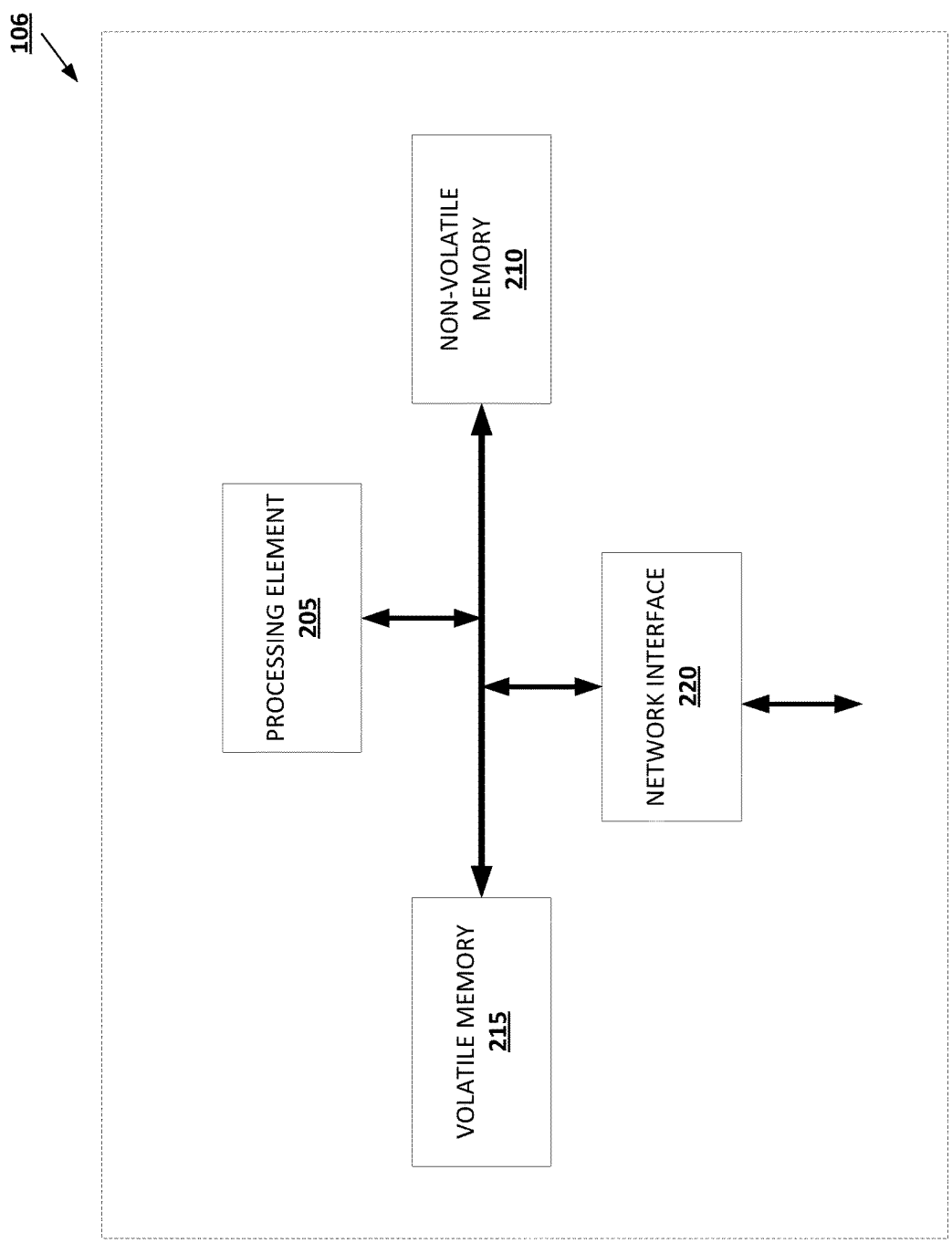

FIG. 2 provides an example NLP computing entity in accordance with some embodiments discussed herein.

Figure 3:
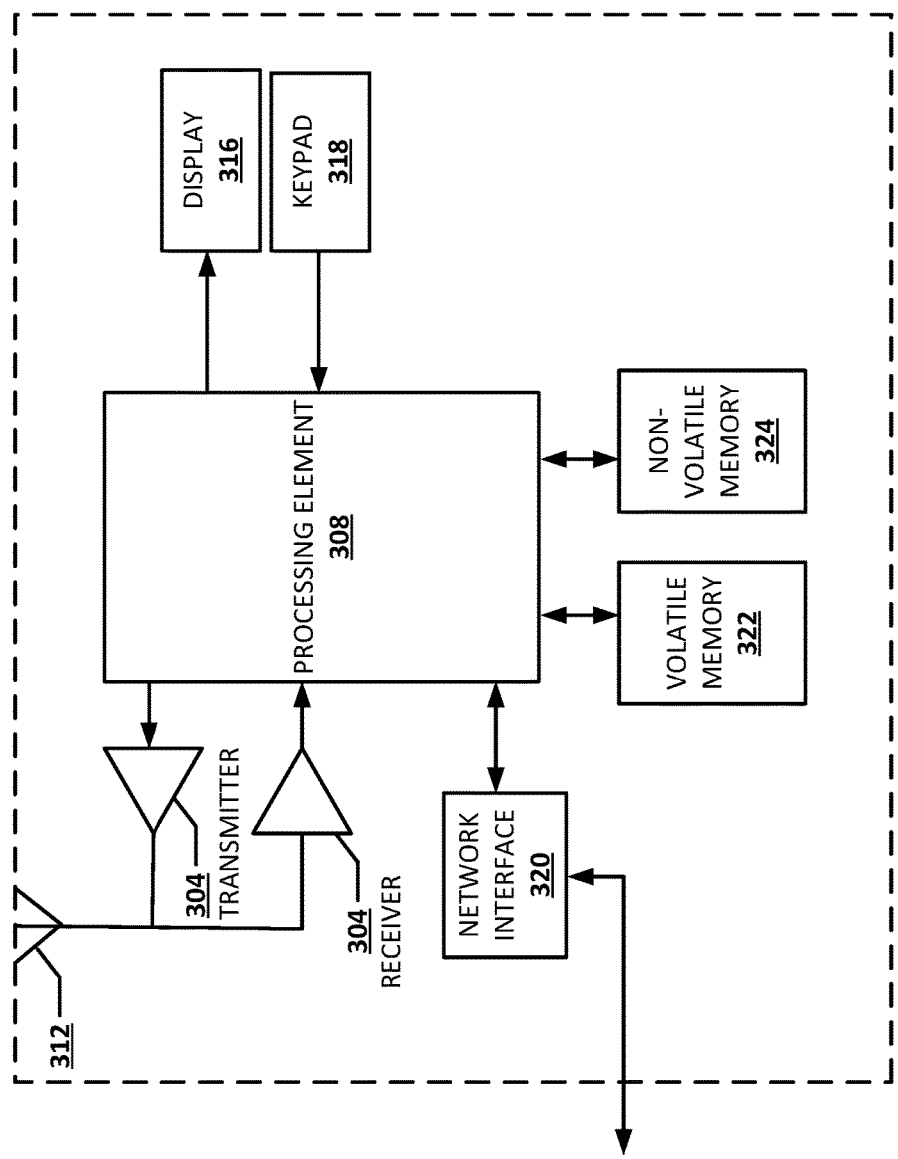

FIG. 3 provides an example external computing entity in accordance with some embodiments discussed herein.

Figure 4:
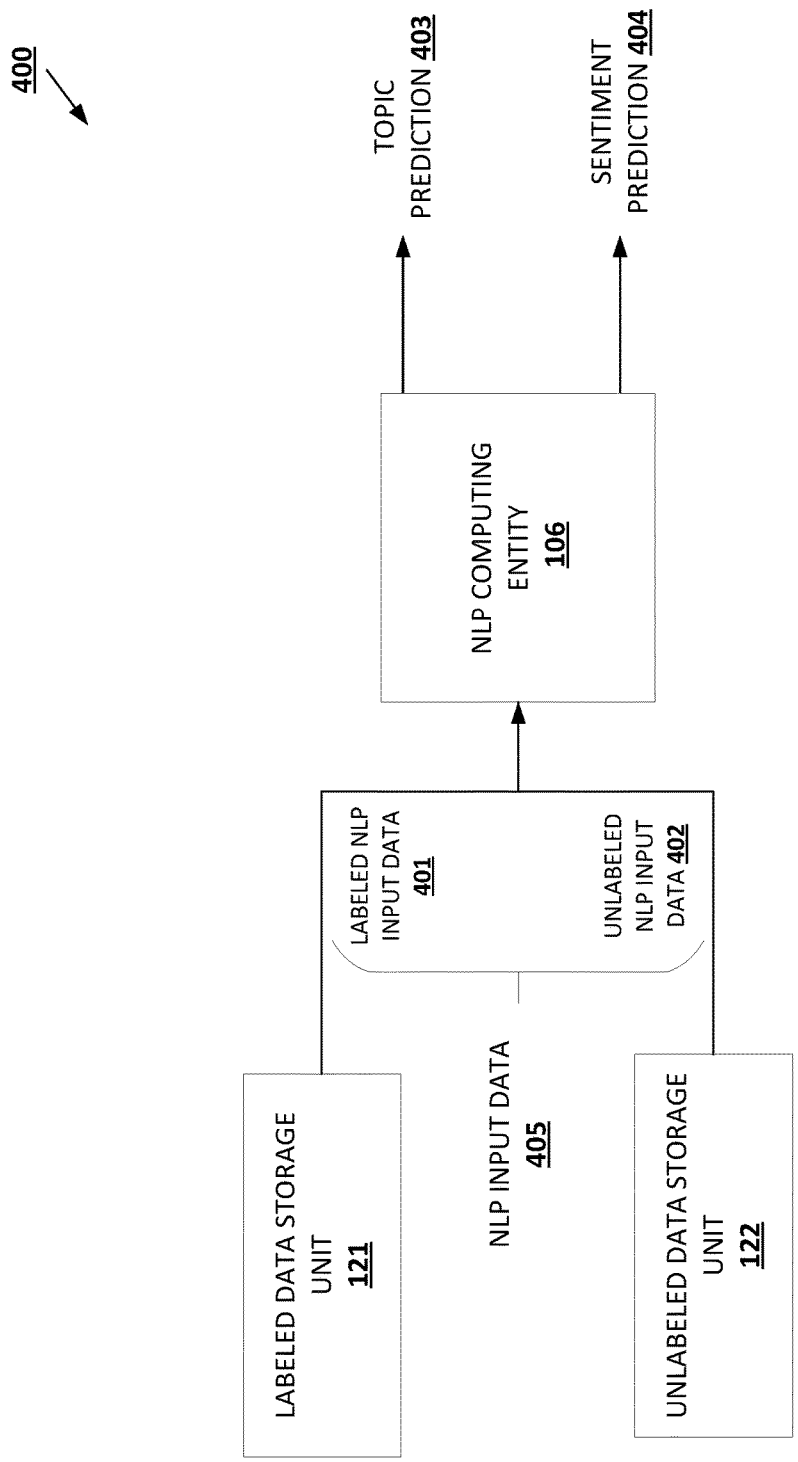

FIG. 4 is a data flow diagram of an example process for generating joint topic-sentiment detections in accordance with some embodiments discussed herein.

Figure 5:
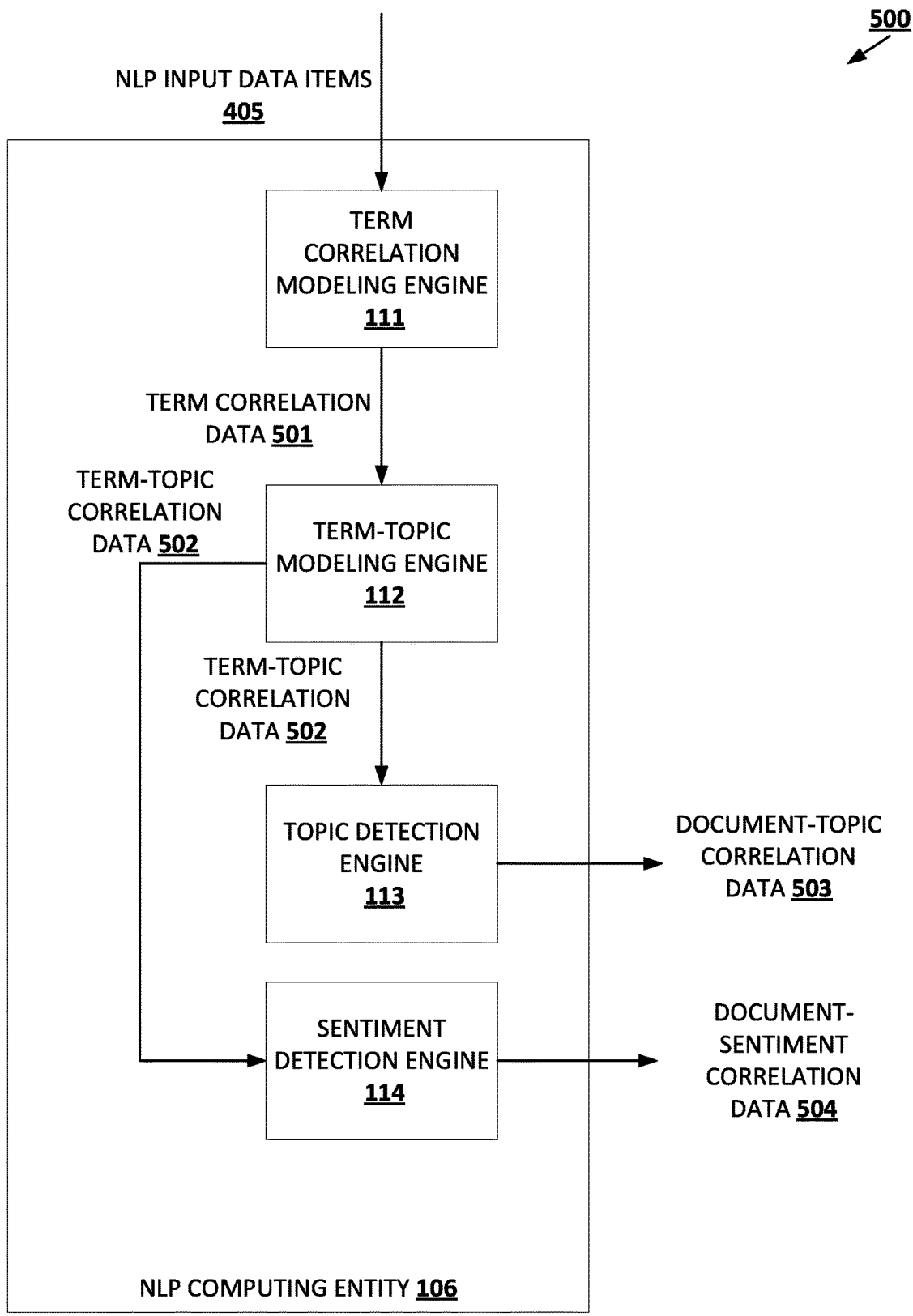

FIG. 5 is a data flow diagram of an example process for generating document-topic correlation data and document-sentiment correlation data in accordance with some embodiments discussed herein.

Figure 6:
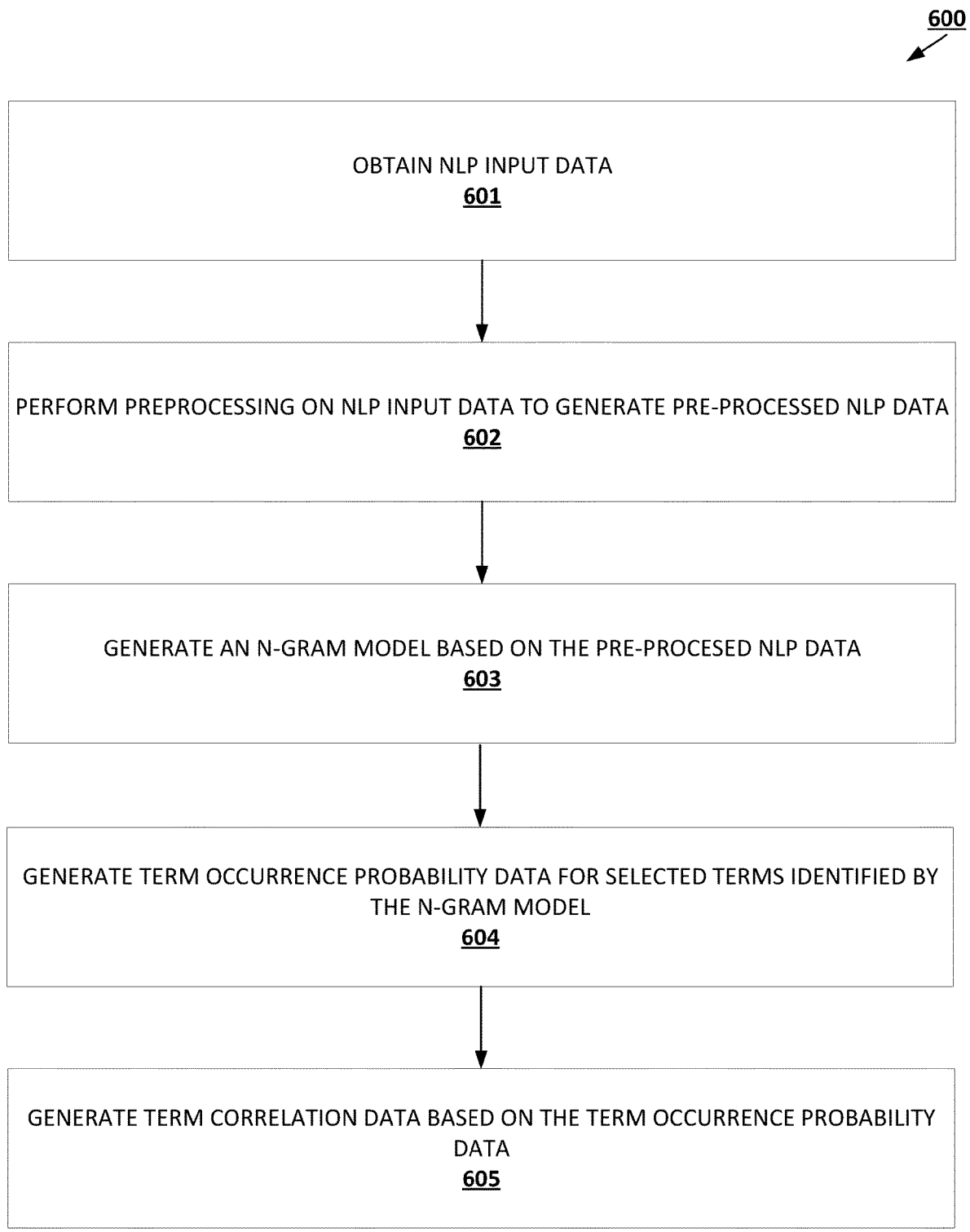

FIG. 6 is a flowchart diagram of an example process for generating term correlation data in accordance with some embodiments discussed herein.

Figure 7:
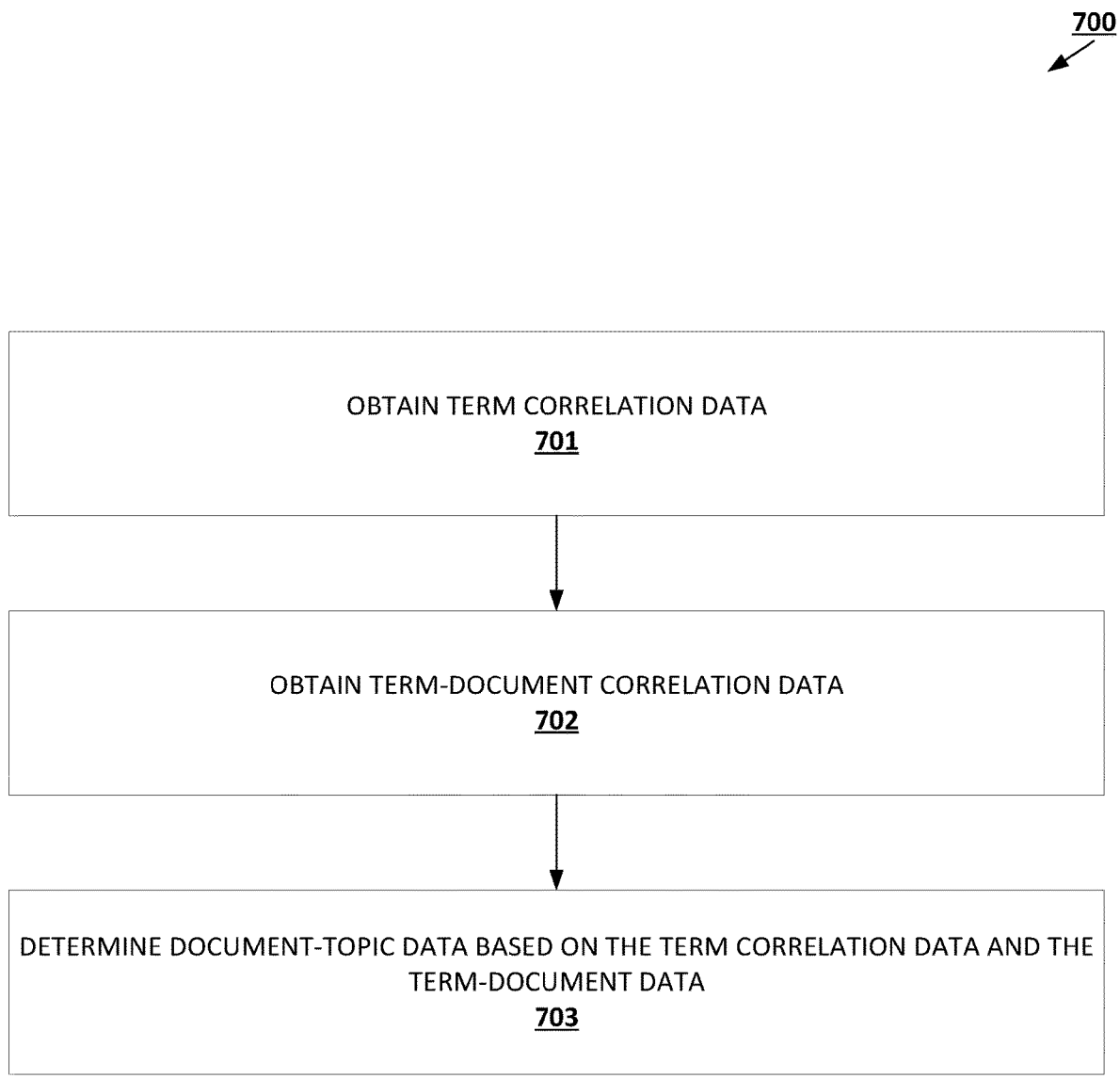

FIG. 7 is a flowchart diagram of an example process for generating document-topic correlation data in accordance with some embodiments discussed herein.

Figure 8:
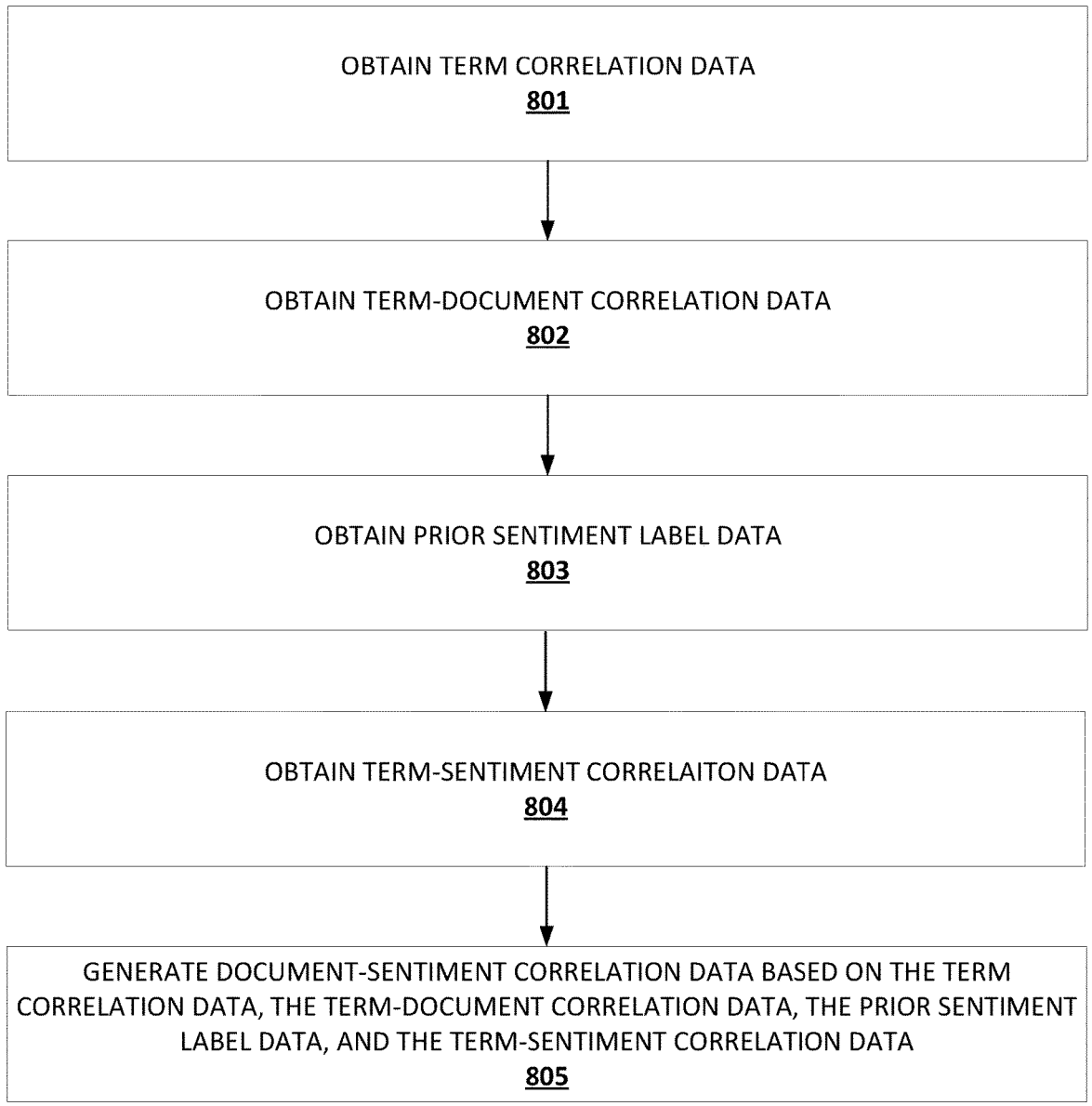

FIG. 8 is a flowchart diagram of an example process for generating document-sentiment correlation data in accordance with some embodiments discussed herein.

Figure 9:
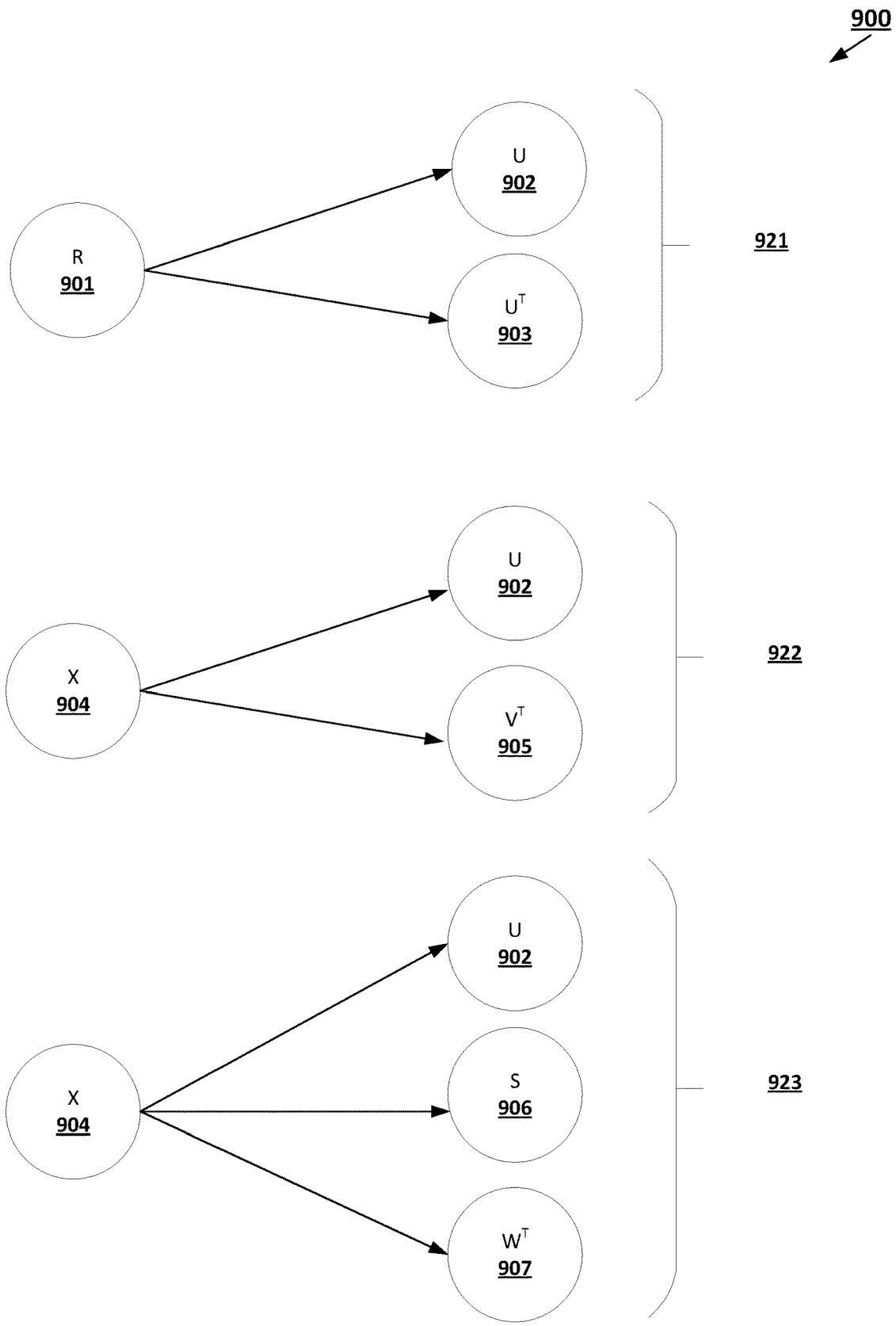

FIG. 9 is an operational flow diagram of an example process for performing a group of interconnected non-negative matrix factorization-based optimizations in accordance with some embodiments discussed herein.

Figure 10:
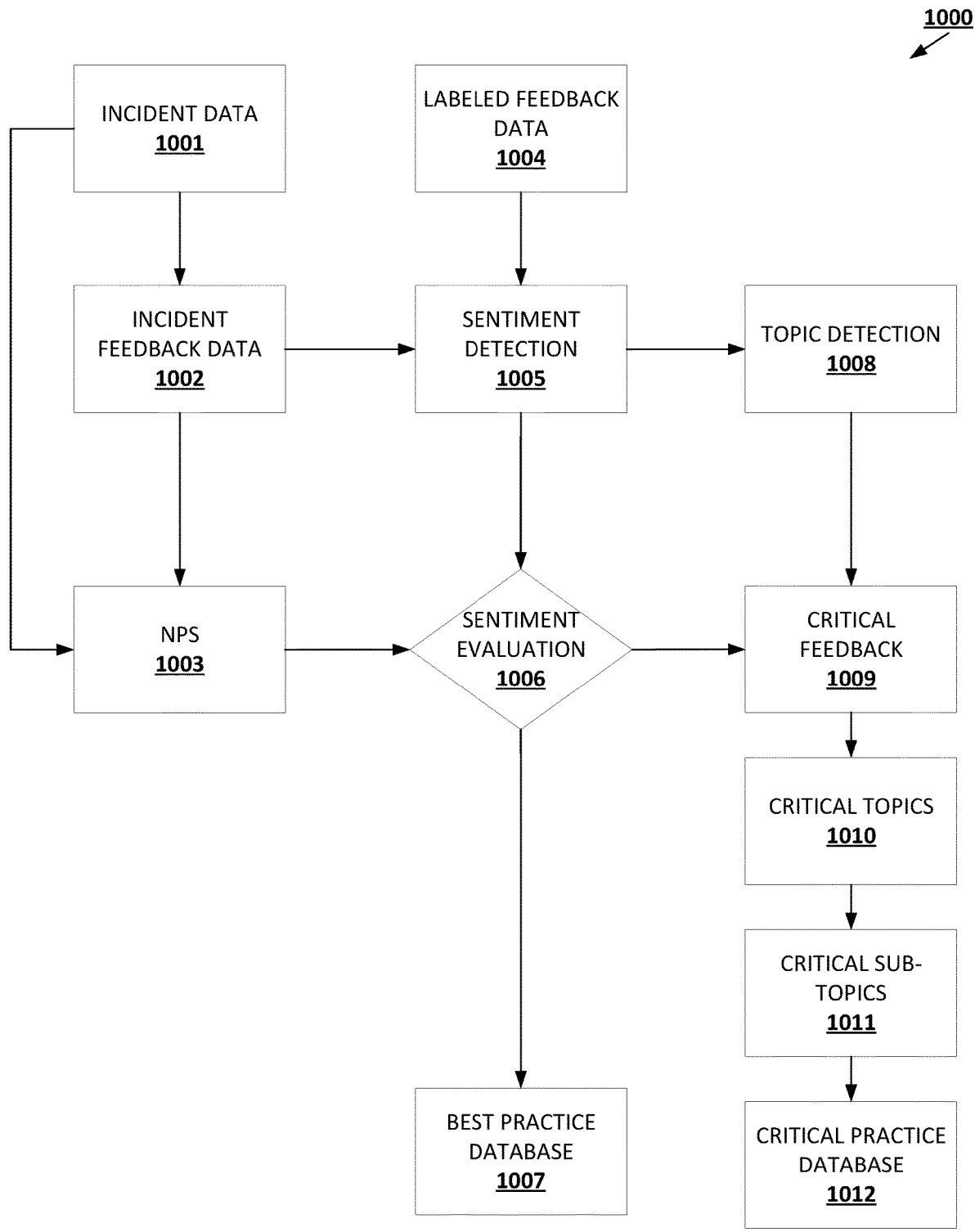

FIG. 10 is an operational flow diagram of an example process for feedback data processing in accordance with some embodiments discussed herein.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media may include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also may include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also may include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also may include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXEMPLARY SYSTEM ARCHITECTURE

FIG. 1 provides an exemplary overview of an architecture 100 that can be used to practice embodiments of the present invention. The architecture 100 may include an NLP system 101 and one or more external computing entities 102, where the one or more external computing entities 102 provide NLP input data (e.g., labeled NLP input data and/or unlabeled NLP input data) to the NLP system 101, and further where the NLP system 101 generates joint topic-sentiment detections for the NLP input data and provides the joint topic-sentiment detections to the one or more external entities. In some embodiments, the NLP system 101 interacts with the one or more external computing entities 102 over a communication network (not shown). The communication network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The NLP system 101 may include an NLP computing entity 106 and a storage subsystem 108. The NLP computing entity 106 is configured to generate joint sentiment-detections for the NLP input data stored in the storage subsystem 108. The storage subsystem 108 may include a labeled data storage unit 121 and an unlabeled data storage unit 122. The NLP computing entity 106 may include a term correlation modeling engine 111, a term-topic modeling engine 112, a topic detection engine 113, and a sentiment detection engine 114.

The labeled data storage unit 121 is configured to store labeled NLP input data items, where labeled each NLP input data item may include an NLP input data item (e.g., a digital document with NLP data) and an associated prior sentiment label for the NLP input data item. The prior sentiment label for an NLP input data item may be an initial sentiment score for the NLP input data item determined using one or more shallow sentiment labeling techniques. The unlabeled data storage unit 122 is configured to store unlabeled NLP input data items, where each unlabeled NLP input data item may include an NLP data item that is not associated with a prior sentiment label for the NLP input data item. Each of the labeled data storage unit 121 and the unlabeled data storage unit 122 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

The term correlation modeling engine 111 is configured to process the NLP input data stored in the storage subsystem (e.g., including the labeled NLP input data items stored in labeled data storage unit 121 and/or the unlabeled NLP input data items stored in unlabeled data storage unit 122) to generate term correlation data for the NLP input data, as the term is further described below. The term-topic modeling engine 112 is configured to process the term correlation data generated by the term correlation modeling engine 111 to generate term-topic correlation data for the NLP input data, as the term is further described below. The topic detection engine 113 is configured to process the term-topic correlation data generated by the term-topic modeling engine 112 to generate document-topic correlation data for the NLP input data, as the term is further described below. The sentiment detection engine 114 is configured to process the term-topic correlation data generated by the term-topic modeling engine 112 to generate document-sentiment correlation data for the NLP input data, as the term is further described below. The NLP computing entity 106 may further may include engines (not depicted) configured to generate topic detections for the NLP input data based on the document-topic correlation data generated by the topic detection engine 113 and/or to generate sentiment detections for the NLP input data based on the document-sentiment correlation data generated by the sentiment detection engine.

In some embodiments, the NLP input data stored in the storage subsystem 108 may include feedback data, such as provider feedback data associated with a healthcare with a healthcare provider institution and/or a health insurance provider system. Moreover, in some embodiments, the NLP computing entity 106 is configured to process the feedback data to generate joint topic-sentiment detections that identify subject matters related to critical feedback and/or subject matters related to positive feedback.

A. Exemplary NLP Computing Entity

FIG. 2 provides a schematic of a NLP computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the NLP computing entity 106 may also may include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the NLP computing entity 106 may include or be in communication with one or more processing elements 205 (also referred to as processors, processing circuitry, and/or similar terms used herein interchangeably) that communicate with other elements within the NLP computing entity 106 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the NLP computing entity 106 may further may include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the NLP computing entity 106 may further may include or be in communication with volatile media (also referred to as volatile storage, memory, memory storage, memory circuitry and/or similar terms used herein interchangeably). In one embodiment, the volatile storage or memory may also may include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the NLP computing entity 106 with the assistance of the processing element 205 and operating system.

As indicated, in one embodiment, the NLP computing entity 106 may also may include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the NLP computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the NLP computing entity 106 may include or be in communication with one or more input elements, such as a keyboard input, a mouse input, a touch screen/display input, motion input, movement input, audio input, pointing device input, joystick input, keypad input, and/or the like. The NLP computing entity 106 may also may include or be in communication with one or more output elements (not shown), such as audio output, video output, screen/display output, motion output, movement output, and/or the like.

B. Exemplary External Computing Entity

FIG. 3 provides an illustrative schematic representative of an external computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. External computing entities 110 can be operated by various parties. As shown in FIG. 3, the external computing entity 102 can may include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the NLP computing entity 106. In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the NLP computing entity 106 via a network interface 320.

Via these communication standards and protocols, the external computing entity 102 can communicate with various other entities using concepts such as Unstructured Supplementary Service Data (USSD), Short Message Service (SMS), Multimedia Messaging Service (MIMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 102 position in connection with a variety of other systems, including cellular towers, Wi-Fi access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 may also comprise a user interface (that can may include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the NLP computing entity 106, as described herein. The user input interface may comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can may include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also may include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the NLP computing entity 106 and/or various other computing entities.

In another embodiment, the external computing entity 102 may include one or more components or functionality that are the same or similar to those of the NLP computing entity 106, as described in greater detail above. As will be recognized, these architectures and descriptions are provided for exemplary purposes only and are not limiting to the various embodiments.

III. OVERVIEW

Discussed herein methods, apparatus, systems, computing devices, computing entities, and/or the like for NLP analysis using sentiment detection configured to generate joint sentiment-topic detections. As will be recognized, however, the disclosed concepts can be used to perform other types of NLP analysis, including NLP analyses configured to generate non-joint NLP property predictions as well as NLP analyses configured to generate joint NLP property predictions other than joint sentiment-topic detections.

A. Technical Problems

Many existing NLP systems face substantial technical challenges in accurately and efficiently detecting reliable properties for relatively short NLP input data, such as detecting topics for with relatively short NLP input data and/or detecting sentiments for relatively short NLP input data. One reason behind the noted technical challenges is that, because of their limited size, relatively short NLP data produce limited valuable input feature data that can be used to accurately and efficiently detect reliable properties for relatively short NLP input data. As a result, existing NLP systems face substantial challenges with effective and efficient feature extraction from relatively short NLP input data. To combat challenges associated with limited feature extraction potentials of relatively short NLP input data, some existing NLP systems rely on computationally inefficient calculations that often require substantial storage bandwidth. Moreover, some existing NLP systems extract NLP features from relatively short NLP input data that are not sufficiently indicative of reliable properties of such data, and thus fail to provide reliable solutions for effectively and accurately reliable properties for relatively short NLP input data.

An example of relatively short NLP input data is feedback data associated with many healthcare systems. Many cooperative healthcare systems aim to transform health care delivery into a mission-driven, patient-centered, value-enhancing system of care. Feedback data, such as patient feedback data and/or provider feedback data could serve as a valuable yardstick for this transformation process. By mining such feedback data, an NLP system can extract customers' sentiment and opinion towards the quality of service they have received from the healthcare providers. However, because of the limitations of many existing NLP systems in accurately and efficiently detecting reliable properties for relatively short NLP input data, they are ill-suited for feedback processing in healthcare systems. As the discussed examples demonstrate, many existing NLP systems face technical challenges in accurately and efficiently detecting reliable properties for relatively short feedback data associated with healthcare systems.

Moreover, many existing NLP systems face significant technical drawbacks in accurately analyzing sentiment information about feedback data to detect relevant semantic properties for such feedback data. For example, many existing NLP systems use supervised learning based on preexisting sentiment-labeled NLP documents to generate sentiment labels for new NLP documents. However, the generated sentiment labels are often poor descriptors of overall semantic structure of the NLP documents. In some cases, while existing NLP systems can provide some useful sentiment information about feedback data, they fail to properly categorize such sentiments in the context of subject-matter-specific features of such feedback data. Thus, many existing NLP systems face technical challenges related to accurately utilizing sentiment information about feedback data in order to detect relevant semantic properties for such feedback data.

For example, a naïve sentiment label for customer feedback saying "coordinate the request with the doctor's office directly instead of me being the middle man" that fails to detect subject matter of the customer feedback (e.g., related to a doctor's visit) will likely fail to properly detect relevant sentiments of the customer feedback. As another example, a sentiment detection for the feedback "the report is with the post office and mail man handled it beautifully" that fails to detect subject matter of the feedback (e.g., related to report mailing) will similarly fail to properly detect reliable properties for the feedback based on the sentiment analysis of the feedback. As the discussed examples demonstrate, many existing NLP systems face technical drawbacks in accurately analyzing feedback data to detect relevant semantic properties.

B. Technical Solutions

Various embodiments of the present invention address technical challenges related to accurately and efficiently detecting reliable properties for relatively short NLP input data, including feedback data associated many healthcare systems, by utilizing NLP models that detect important features from NLP data using groups of interconnected factorization-based optimizations. For example, various embodiments of the present invention use optimization of non-negative matrix factorization (NMF) models and/or non-negative matrix tri-factorization (3-factor NMF) models. By utilizing NMF models and/or 3-factor NMF models, various embodiments of the present invention effectively and efficiently relate raw feature data associated with NLP data to more sophisticated correlation models that describe semantically deeper inferences about the NLP data. In doing so, various embodiments of the present invention address technical drawbacks of many existing NLP systems in accurately and efficiently detecting reliable properties for relatively short NLP input data, including feedback data associated many healthcare systems.

For example, in some embodiments, a disclosed NLP system performs a constrained 3-factor NMF of a term-document correlation matrix which can be implemented using simple update rules, where the constraints in the mentioned optimization problem may include inequality constraints on sentiment values of feedback data and a subset of pre-existing labeled feedback data (e.g., with real-valued sentiment scores). In doing so, the noted embodiments enable integrating domain-specific data (e.g., the subset of pre-existing labeled feedback data) in addition to input feature data to generate feature values for feedback documents. As a result, the disclosed NLP systems utilize minimal feature data to infer substantial and important conclusions about semantic (e.g., sentimental and/or topical) structure of feedback data. This in turn provides solutions for efficient and effective detection of reliable properties for relatively short NLP input data, including feedback data associated many healthcare systems.

In some embodiments, disclosed NLP systems address relative shortness of NLP input data by factoring feature data (e.g., term correlation data for the feedback data) for the NLP input data using NMF-based optimization to generate term-topic correlation data, rather by utilizing high-dimensional and sparse term occurrence information associated with the NLP input data to generate term-topic correlation data. This alone provides substantial efficiency advantages (e.g., by reducing the need for utilizing storage-intensive and computationally-complex data such as the high-dimensional and sparse term occurrence information associated with NLP input data) as well as substantial accuracy advantages (e.g., by providing extraction of more reliable and more semantically representative features associated with NLP input data) compared to many existing NLP systems. Moreover, in some embodiments, subsequent to the above-noted NMF-based optimization to generate term-topic correlation data, the disclosed NLP systems detect document-topic correlation data from the term-document correlation data using another NMF-based optimization, thus further expanding the efficiency and accuracy advantages offered by various embodiments of the present invention in accurately and efficiently detecting reliable properties for relatively short NLP input data, including feedback data associated many healthcare systems.

In some embodiments, disclosed NLP systems use an optimization based on a 3-factor NMF model to learn sentiment values for unlabeled texts in a manner that allows for integrating domain-specific data (e.g., prior sentiment labels, such as initial sentiment labels by a Clarabridge kind of sentiment analysis engine) in calculating document-sentiment correlation data. This in turn creates an efficient and effective sentiment classification system for relatively short NLP input data, including feedback data associated many healthcare systems. Indeed, experimental results show that some aspects of the disclosed techniques achieve around 80% accuracy in both topic detection and sentiment detection, thus outperforming many existing NLP systems.

Moreover, various embodiments of the present invention address technical challenges related to accurately analyzing sentiment information about feedback data to detect relevant semantic properties for such feedback data by jointly detecting topic and sentiment designations for such feedback data.

In some embodiments, disclosed NLP systems perform topic detection using constrained-NMF-based models and perform sentiment detection using constrained-3-factor-NMF-based models. In doing so, the disclosed NLP systems provide solutions for accurately detecting relevant semantic properties for feedback data, such as healthcare-related feedback data, where the provided solutions can be integrated in existing feedback processing systems without the need to modify underlying feedback gathering and processing mechanisms. Accordingly, by disclosing solutions for jointly detecting topic and sentiment designations for feedback data, various embodiments of the present invention address technical challenges related to accurately analyzing sentiment information about feedback data to detect relevant semantic properties for such feedback data.

IV. EXEMPLARY SYSTEM OPERATION

Various embodiments of the present invention address technical challenges related to accurately and efficiently detecting reliable properties for relatively short NLP input data, including feedback data associated many healthcare systems, by utilizing NLP models that detect important features from NLP data using groups of interconnected factorization-based optimizations. For example, various embodiments of the present invention use optimization of non-negative matrix factorization (NMF) models and/or non-negative matrix tri-factorization (3-factor NMF) models. By utilizing NMF models and/or 3-factor NMF models, various embodiments of the present invention effectively and efficiently relate raw feature data associated with NLP data to more sophisticated correlation models that describe semantically deeper inferences about the NLP data. In doing so, various embodiments of the present invention address technical drawbacks of many existing NLP systems in accurately and efficiently detecting reliable properties for relatively short NLP input data, including feedback data associated many healthcare systems.

Joint Topic-Sentiment Detection

FIG. 4 is a data flow diagram of an example process 400 for generating a topic detection 403 and a sentiment detection 404 for each of one or more unlabeled NLP input data items 402. Via the various steps/operations of process 400, a system of one or more computers (e.g., the NLP system 101 of FIG. 1) can perform joint topic-sentiment detection for NLP inputs.

The process 400 begins when the NLP computing entity 106 receives the one or more unlabeled NLP input data items 402 from the unlabeled data storage unit 122 and one or more labeled NLP input data items 401 from the labeled data storage unit 121. In some embodiments, a labeled NLP input data item 401 is a collection of data (e.g., a collection of text data, such as a digital document) that is associated with a pre-existing sentiment label (where the pre-existing sentiment label for the labeled NLP input data item 401 is part of the labeled NLP input data item 401), while an unlabeled NLP input data item 401 is a collection of data that is not associated with a preexisting sentiment label. In some embodiments, the NLP computing entity 106 is configured to use the labeled NLP input data items 401 and the unlabeled NLP input data items 402 (collectively, the NLP input data items 405) to determine at least one of the topic detection 403 and the sentiment detection 404 for each of the unlabeled NLP input data items 402. In some embodiments, the storage system 108 is configured to retrieve at least some of the unlabeled NLP input data items 402 and/or at least some of labeled NLP input data items 401 from one or more external computing entities 102.

The process 400 continues when the NLP computing entity 106 uses the NLP input data items 405 to determine the topic detection 403 and the sentiment detection 404 for each of the unlabeled NLP input data items 402. In some embodiments, when each NLP input data item in the NLP input data items 405 is associated with a digital document (e.g., a collection of data such as text, including a collection feedback data), the NLP computing entity 106 may utilize the NLP input data items 405 to generate document-topic correlation data and document-sentiment correlation data for the NLP input data items. The NLP computing entity 106 may then utilize the document-topic correlation data and the document-sentiment correlation data for the NLP input data items to generate the topic detection 403 and the sentiment detection 404 for each of the unlabeled NLP input data items 402.

The document-topic correlation data may include one or more document-topic correlation objects (e.g., a document-topic correlation matrix) that indicate, for each digital document associated with the NLP input data items 405, a corresponding document-topic correlation indicator for the respective digital document and each of one or more topics. In some embodiments, a document-topic correlation indicator for a digital document and a topic indicates a measure of correspondence of the digital document with the topic. In some embodiments, a topic may be defined by one or more terms and/or one or more weight values that each relate the topic to a particular. For example, a particular topic associated with law may be characterized by words such as "law, legal, lawyer, jury, case." As another example, a particular topic associated with sports may be characterized by weight values such as weight("sports")=1.0, weight("athlete")=0.9, weight("match")=0.5, and weight("trophy")=0.4.

The document-sentiment correlation data may include one or more document-sentiment correlation objects (e.g., a document-sentiment correlation matrix) that indicate, for each digital document associated with the NLP input data items 405, a corresponding document-sentiment correlation indicator for the digital document and each of one or more sentiments. In some embodiments, a document-sentiment correlation indicator for a digital document and a sentiment indicates a measure of correspondence of the digital document with the sentiment. In some embodiments, a sentiment may be characterized by one or more discrete and/or one or more continuous values, where the noted values may be selected from a sentiment space such as an embedding space. Examples of sentiments may include a happy sentiment, an angry sentiment, a concerned sentiment, other sentiments, and/or the like. Sentiments may be defined by one-dimensional and/or multi-dimensional values.

In some embodiments, the document-topic correlation data 503 and the document-sentiment correlation data 504 for the NLP input data items 405 may be computed using the process 500 of FIG. 5. As depicted in FIG. 5, process 500 begins when the term correlation modeling engine 111 processes the NLP input data items 405 to generate term correlation data 501 for the NLP input data items 405. In some embodiments, the term correlation data 501 comprises one or more term correlation data objects (e.g., a term correlation matrix) that indicate, for each term of a group of terms, a corresponding measure of co-occurrence likelihood of the respective term with each other term in the group of terms, where the measure of co-occurrence frequency is determined based on co-occurrences of terms in the NLP input data items 405 (e.g., in one or more digital documents associated with the NLP input data items 405).

In some embodiments, the term correlation modeling engine 111 generates the term correlation data 501 in accordance with process 600 of FIG. 6. As depicted in FIG. 6, process 600 begins at step/operation 601 when the term correlation modeling engine 111 obtains the NLP input data items 405. At step/operation 602, the term correlation modeling engine 111 performs pre-processing on the NLP input data items 405 to generate pre-processed NLP input data items. Examples of pre-processing tasks performed on the NLP input data items 405 to generate the pre-processed NLP input data items may include shallow NLP tasks such as chunking, shallow parsing, tokenizing, and/or the like.

At step/operation 603, the term correlation modeling engine 111 generates an n-gram model for the pre-processed NLP input data items, where the n-gram model may identify one or more n-grams (e.g., unigrams, bigrams, where n may be determined by system configuration data) in the pre-processed NLP input data items. An n-gram may be a combination of one or more words and/or semantic tokens. In this disclosure, the terms "n-gram" and "term" have been used interchangeably. In some embodiments, to generate the n-gram model for the pre-processed NLP input data items, the term correlation modeling engine 111 may utilize one or more syntactic indicators of n-grams (e.g., whitespace characters). In some embodiments, to generate the n-gram model for the pre-processed NLP input data items, the term correlation modeling engine 111 may utilize a sematic model of the pre-processed NLP input data items, such as a semantic model determined using part-of-speech tagging.

At step/operation 604, the term correlation modeling engine 111 generates term occurrence probability data for one or more selected terms, where the one or more selected terms may include at least some of the terms identified by the n-gram model. In some embodiments, the term occurrence probability data for the selected terms include: (i) a singular occurrence probability for each selected term and (ii) a corresponding joint occurrence probability for each pair of selected terms. For example, given three selected terms $t_i$, $t_j$, and $t_k$, the term correlation modeling engine 111 may generate a singular occurrence probability $P(t_i)$ for the term $t_i$, a singular occurrence probability $P(t_j)$ for the term $t_j$, a singular occurrence probability $P(t_k)$ for the term $t_k$, a joint occurrence probability $P(t_i,t_j)$ for the terms $t_i$ and $t_j$, a joint occurrence probability $P(t_i,t_k)$ for the terms $t_i$ and $t_k$, and a joint occurrence probability $P(t_j, t_k)$ for the terms $t_j$ and $t_k$.

In some embodiments, to generate a singular term distribution probability $P(t_n)$ for a term $t_n$, the term correlation modeling engine 111 performs operations corresponding to the equation:

$$P(t_n) = \frac{\sum_m \#(t_n, t_m)}{\sum_{p,q} \#(t_p, t_q)}, \qquad \text{(Equation 1)}$$

where $\#(t_a,t_b)$ denotes a measure of frequency of co-occurrence of terms $t_a$ and $t_b$ in the preprocessed NLP data (e.g., occurrence of the two terms within the same digital document and/or within a threshold proximity of each other). In some embodiments, to generate a joint term distribution probability $P(t_n,t_m)$ for the terms $t_n$ and $t_m$, the term correlation modeling engine 111 performs operations corresponding to the equation:

$$P(t_n, t_m) = \frac{\#(t_m, t_n)}{\sum_{p,q} \#(t_p, t_q)}, \qquad \text{(Equation 2)}$$

where $\#(t_a, t_b)$ denotes a measure of frequency of co-occurrence of terms $t_a$ and $t_b$ in the preprocessed NLP data.

At step/operation 605, the term correlation modeling engine 111 generates the term correlation data 501 for the selected terms based on the term occurrence probability data for the selected terms. In some embodiments, the term correlation data 501 include, for each pair of selected terms, a term correlation indicator. In some embodiments, the term correlation indicator for a pair of selected terms indicates a measure of co-occurrence frequency of the pair of selected terms in the NLP input data items 405. In some embodiments, the term correlation indicator for a pair of selected terms is determined based on a point-wise mutual information (PMI) indicator for the pair of selected terms. In some embodiments, to determine a term correlation indicator $r_{ij}$ for a pair of terms $t_i$ and $t_j$, the term correlation modeling engine 111 performs operations corresponding to the equation:

$$r_{ij} = PMI(t_i, t_j) = \max\left(\log\frac{P(t_i, t_j)}{P(t_i)P(t_j)},\ 0\right). \qquad \text{(Equation 3)}$$

Returning to FIG. 5, after generating the term correlation data 501, the term correlation modeling engine 111 provides the term correlation data 501 to the term-topic modeling engine 112, which in turn uses the term correlation data 501 to generate term-topic correlation data 502. In some embodiments, the term topic data may include one or more term-topic correlation objects (e.g., a term-topic correlation matrix) that indicate, for each of one or more selected terms associated with the NLP input data items 405 (e.g., the selected terms identified based on the n-gram model generated in step/operation 603), a corresponding term-topic correlation indicator for the respective selected term and each of one or more topics. In some embodiments, to determine a term-topic correlation matrix U based on a term correlation matrix R (e.g., a matrix that may include term correlation data for the selected terms), the term-topic modeling engine 112 optimizes the following cost function:

$$J_1(U) = \tfrac{1}{2}\|R - UU^T\|^2 \qquad \text{(Equation 4)}$$

where T denotes a matrix transpose operation and term-topic correlation data U is greater than or equal to zero.

In some embodiments, a term-topic correlation indicator for a selected term and a topic indicates a measure of correspondence of the selected term with the topic. In some embodiments, a topic may be defined by one or more terms and/or one or more weight values that each relate the topic to a particular. For example, a particular topic associated with law may be characterized by words such as "law, legal, lawyer, jury, case." As another example, a particular topic associated with sports may be characterized by weight values such as weight("sports")=1.0, weight("athlete")=0.9, weight("match")=0.5, and weight("trophy")=0.4.

After generating the term-topic correlation data 502, the term-topic modeling engine 112 provides the term-topic correlation data 502 to both the topic detection engine 113 and the sentiment detection engine 114. The topic detection engine 113 uses the term-topic correlation data 502 to generate the document-topic correlation data 503, while the sentiment detection engine 114 uses the term-topic correlation data 502 to generate the document-sentiment correlation data 504. In some embodiments, the topic detection engine 113 determines the document-topic correlation data 503 based on the term-topic correlation data 502 using an NMF optimization of the document-topic correlation data 503 into two or more optimization factors, where the two or more optimization factors may include the term-topic correlation data 502. In some embodiments, the sentiment detection engine 114 determines the document-topic correlation data 503 based on the term-topic correlation data 502 using a 3-factor NMF into three or more optimization factors, where the three or more optimization factors may include the term-topic correlation data 502.

In some embodiments, to generate the document-topic correlation data 503 based on the term-topic correlation data 502, the topic detection engine 113 performs the various steps/operations of process 700 of FIG. 7. The process 700 starts at step/operation 701 when the topic detection engine 113 obtains the term correlation data 501. At step/operation 702, the topic detection engine 113 obtains the term-document correlation data. In some embodiments, the term-document correlation data may include one or more term-document correlation objects (e.g., a term-document correlation matrix) that indicate, for each selected term of one or more selected terms associated with the NLP input data items 405 (e.g., the selected terms identified based on the n-gram model generated in step/operation 603), a term-document correlation indicator for each of one or more digital documents associated with the NLP input data items 405. In some embodiments, a term-document correlation indicator for a selected term and a digital document is a measure of presence or absence of the selected term in the digital document and/or a measure of extent of occurrence of the selected term in the digital document. At step/operation 703, the topic detection engine 113 generates the document-topic correlation data 503 based on the term correlation data 501 and the term-document correlation data. In some embodiments, to generate the document-topic correlation data V based on the term correlation data U and the term-document correlation data V, the topic detection engine 113 optimizes the following NMF equation:

$$J_2(V) = \tfrac{1}{2}\|X - UV^T\|^2 \qquad \text{(Equation 5)}$$

where T denotes a matrix transpose operation and term-document correlation data V has to be more than or equal to zero.

In some embodiments, to generate the document-sentiment correlation data 504 based on the term-topic correlation data 502, the sentiment detection engine 114 performs the various steps/operations of process 800 of FIG. 8. The process 800 begins at step/operation 801 when the sentiment detection engine 114 obtains term-topic correlation data 502. The process begins at step/operation 801 when the sentiment detection engine 114 obtains the term correlation data 501. At step/operation 802, the sentiment detection engine 114 obtains term-document correlation data (e.g., the term-document correlation data discussed in reference to step/operation 702 of FIG. 7).

At step/operation 803, the sentiment detection engine 114 obtains prior sentiment label data for the NLP input data items 405. In some embodiments, the prior sentiment label data are determined based on the labeled NLP input data items 401. In some embodiments, the prior sentiment label data are stored in one or more prior sentiment label data objects (e.g., a prior sentiment label matrix) that indicates: (i) for each of one or more labeled NLP input data items 401, a prior sentiment label, and (ii) for each of the one or more unlabeled NLP input data items 402, designated prior sentiment labels (e.g., null prior sentiment labels).

At step/operation 804, the sentiment detection engine 114 obtains term-sentiment correlation data. In some embodiments, the term-sentiment correlation data may include one or more term-sentiment correlation objects (e.g., a term-sentiment correlation matrix) that indicate, for each selected term of one or more selected terms associated with the NLP input data items 405 (e.g., the selected terms identified based on the n-gram model generated in step/operation 603), a term-sentiment correlation indicator for each of one or more sentiments. In some embodiments, a term-sentiment correlation indicator for a selected term and a sentiment is a measure of correspondence of the selected term to the sentiment.

At step/operation 805, the sentiment detection engine 114 generates the document-sentiment correlation data 504 based on the term-topic correlation data 502, the term-document correlation data, the prior sentiment label data, and the topic-sentiment correlation data. In some embodiments, to the document-sentiment correlation data W based on the term-topic correlation data U, the term-document correlation data X, the prior sentiment label data $W_0$, and the term-sentiment correlation data S, the sentiment detection engine 114 performs operations corresponding to the following 3-factor NMF equation:

$$\min \tfrac{1}{2}[\|X - USW^T\|^2 + \mu(tr(W - W_0)^T C(W - W_0))], \qquad \text{(Equation 6)}$$

where tr is a matrix trace operation, $\mu$ is a positive scaling factor, T denotes a matrix transpose operation, and C is a diagonal matrix whose diagonal values are set to a designated value (e.g., a one value).

Returning to FIG. 5, at least one of the generation of the term-topic correlation data 502 by the term-topic modeling engine 112, generation of the document-topic correlation data 503 by the topic detection engine 113, and generation of document-sentiment correlation data 504 by the sentiment detection engine 114 may be performed using a factorization-based optimization. Examples of parameters for such matrix-factorization-based optimizations are depicted in the process 900 of FIG. 9. As depicted in FIG. 9, the process 900 may include a first factorization-based optimization 921 which factorizes a term correlation matrix R 901 into a term-topic correlation matrix U 902 and a term-topic correlation transpose matrix $U^T$ 903. Furthermore, the process 900 may include a second factorization-based optimization 922 which factorizes a term-document correlation matrix X 904 into the term-topic correlation matrix U 902 and a document-topic correlation transpose matrix $V^T$ 905. Moreover, the process 900 may include a third factorization-based optimization 923 which factorizes the term-document correlation matrix X 904 into the term-topic correlation matrix U 902, a topic-sentiment correlation matrix S 906, and a prior sentiment label transpose matrix $W^T$ 907.

Returning to FIG. 4, the NLP computing entity 106 may determine the topic detection 403 based on the document-topic correlation data 503. In some embodiments, the NLP computing entity 106 may determine, for each digital document associated with the NLP input data items 405, n topics having the highest document-topic correlation indicator as the detected topics for the digital document. In some embodiments, the NLP computing entity 106 may determine, for each digital document associated with the NLP input data items 405, any topics whose document-topic correlation indicator in relation to the digital document exceeds a threshold document-topic correlation as the detected topics for the digital document.

The NLP computing entity 106 may also determine the sentiment detection 404 based on the document-sentiment correlation data 504. In some embodiments, the NLP computing entity 106 may determine, for each digital document associated with the NLP input data items 405, n sentiments having the highest document-sentiment correlation indicator as the detected sentiment for the digital document. In some embodiments, the NLP computing entity 106 may determine, for each digital document associated with the NLP input data items 405, any sentiments whose document-sentiment correlation indicator in relation to the digital document exceeds a threshold document-sentiment correlation as the detected sentiment for the digital document.

Feedback Processing

At least some aspects of the joint topic-sentiment detection for NLP input data items may be utilized by a feedback processing system which analyzes NLP feedback data to determine operational conclusions for a feedback-receiving institution. An example of NLP feedback data may include feedback data associated with a healthcare provider institution and/or a health insurance provider system, such as survey response data received from providers and/or patients. In some embodiments, at least some aspects of the joint topic-sentiment detection for NLP input data items may be utilized as part of provider listening post synthesized analysis by a health insurance provider institution during a credentialing phase of a medical claim lifecycle.

FIG. 10 is an operational flow diagram of an example process 1000 for processing incident feedback data for an incident. Via the various steps/operations of process 400, a system of one or more computers (e.g., the NLP system 101 of FIG. 1) can perform feedback processing by using joint topic-sentiment detection of NLP inputs.

The process 1000 begins when the NLP computing entity 106 obtains incident data 1001 and the incident feedback data 1002 for the incident. The NLP computing entity 106 processes the incident data 1001 and the incident feedback data 1002 to determine an NPS 1003 for the incident feedback data 1002, where the NPS 1003 is an example of a customer behavior indicator at a brand level for the incident feedback data 1002. The NLP computing entity 106 further processes the incident feedback data 1002, along with labeled feedback data (e.g., the labeled NLP input data items 401), to determine a sentiment detection 1005 (e.g., the sentiment detection 404) for the incident feedback data 1002. The NLP computing entity 106 further processes the sentiment detection 1005 for the incident feedback data 1002 to determine a topic detection 1008 (e.g., the topic detection 403) for the incident feedback data 1002.

At step/operation 1006, the NLP computing entity 106 determines whether the incident feedback data 1002 relates to critical feedback 1009 and/or to positive feedback. For example, the NLP computing entity 106 may determine that the incident feedback data 1002 relates to critical feedback 1009 if the sentiment detection 1005 for the incident feedback data 1002 exceeds a sentiment detection threshold and/or if the NPS 1003 for the incident feedback data 1002 exceeds an NPS threshold. As another example, the NLP computing entity 106 may determine that the incident feedback data 1002 relates to positive feedback if the sentiment detection 1005 for the incident feedback data 1002 fails to exceed a sentiment detection threshold and/or if the NPS 1003 for the incident feedback data 1002 fails to exceed an NPS threshold. In some embodiments, the NLP computing entity 106 may determine that the incident feedback data 1002 relates to critical feedback 1009 if the sentiment detection 1005 for the incident feedback data 1002 exceeds a sentiment detection threshold and the NPS 1003 for the incident feedback data 1002 exceeds an NPS threshold. In some embodiments, the NLP computing entity 106 may determine that the incident feedback data 1002 relates to positive feedback if either the sentiment detection 1005 for the incident feedback data 1002 exceeds a sentiment detection threshold or the NPS 1003 for the incident feedback data 1002 exceeds an NPS threshold.

Process 1000 continues with the NLP computing entity 106 storing the incident feedback data in a best practice database 1007 in response to determining that the incident feedback data 1002 relates to positive feedback. Moreover, in response to determining that the incident feedback data 1002 relates to critical feedback 1009, the NLP computing entity 106 determines critical topics 1010 (e.g., indicating which particular detected topics associated with the topic detection 1008 pertain to the critical sentiment of the incident feedback data 1002) and/or critical sub-topics 1011 (e.g., indicating which particular detected sub-topics associated with the detected critical topics 1010 pertain to the critical sentiment of the incident feedback data 1002). The NLP computing entity 106 then stores the detected critical topics 1010 and/or the detected critical sub-topics 1011 in the critical practice database 1012.

In some embodiments, the NLP computing entity 106 processes unlabeled feedback digital documents to generate, for each unlabeled feedback document, a sentiment detection 404 and a topic detection 403. For example, the NLP computing entity 106 may determine that a first unlabeled feedback document has a positive sentiment and relates to inpatient services. In response, the NLP computing entity 106 may designate the topic detection 403 for the first unlabeled feedback document (e.g., the inpatient services topic) as a positively-reflected topic. As another example, the NLP computing entity 106 may determine that a second unlabeled feedback document has a positive sentiment and relates to outpatient services. In response, the NLP computing entity 106 may designate the topic detection 403 for the second unlabeled feedback document (e.g., the outpatient services topic) as a positively-reflected topic.

As a further example, the NLP computing entity 106 may designate the sentiment detection 404 for a third unlabeled feedback document as a negative sentiment detection. In response, the NLP computing entity 106 may determine a topic detection 404 and/or a sub-topic detection associated with the third unlabeled feedback document as a critical topic and/or sub-topic. In some embodiments, the NLP computing entity 106 may utilize one or more critical topics and/or one or more critical sub-topics to generate an incident report. In some embodiments, the NLP computing entity 106 may utilize one or more critical topics and/or one or more critical sub-topics to generate one or more real-time alerts, such as one or more voice prompt alerts. In some embodiments, the NLP computing entity 106 may utilize one or more critical topics and/or one or more critical sub-topics to seek additional feedback from interested user profiles and/or user profiles deemed to be informed about the one or more critical topics and/or the one or more critical sub-topics.

V. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
    obtaining, by one or more processors, a term correlation data object for a plurality of digital documents, wherein: (1) the term correlation data object comprises a plurality of term correlation indicators for a plurality of terms, and (2) the plurality of term correlation indicators describes co-occurrences of the plurality of terms in the plurality of digital documents;
    determining, by the one or more processors and based at least in part on the term correlation data object, a term-topic correlation data object for the plurality of digital documents, wherein: (1) the term-topic correlation data object comprises a plurality of term-topic correlation indicators, (2) the plurality of term-topic correlation indicators describes relationships between the plurality of terms and a plurality of topics, (3) the term-topic correlation data object is determined by a term-topic factorization of the term correlation data object into a plurality of inferred term-topic data objects, and (4) the plurality of inferred term-topic data objects comprises the term-topic correlation data object;
    determining, by the one or more processors and based at least in part on the term-topic correlation data object, a document-topic correlation data object for the plurality of digital documents, wherein: (1) the document-topic correlation data object comprises a plurality of document-topic correlation indicators, (2) the plurality of digital document topic correlation indicators describes relationships between the plurality of digital documents and a plurality of topics, (3) the document-topic correlation data object is determined by a document-topic factorization of a source term-document data object into a plurality of inferred document-topic data objects, and (4) the plurality of inferred document-topic data objects comprises the document-topic correlation data object;
    determining, by the one or more processors and based at least in part on the term-topic correlation data object, a document-sentiment correlation data object for the plurality of digital documents, wherein: (1) the document-sentiment correlation data object comprises a plurality of document-sentiment correlation indicators, (2) the plurality of digital documents-sentiment correlation indicators describe relationships between the plurality of digital documents and a plurality of sentiments, (3) the document-topic correlation data object is determined by a document-sentiment factorization of a source document-sentiment data object into a plurality of inferred document-sentiment data objects, and (4) the plurality of inferred document-topic data objects comprises the document-sentiment correlation data object;
    generating, by the one or more processors, the topic detection based at least in part on the document-topic correlation object; and
    generating, by the one or more processors, the sentiment detection based at least in part on the document-sentiment correlation object.

2. The computer-implemented method of claim 1, further comprising:
    identifying a term-document correlation data object for the plurality of digital documents, wherein: (1) the term-document correlation data object comprises a plurality of term-document correlation indicators, and (2) the plurality of term-document correlation indicators describes relationships between the plurality of terms and the plurality of digital documents.

3. The computer-implemented method of claim 2, wherein:
    the plurality of term-document correlation indicators comprises a term-document correlation indicator for each term-document pair associated with a term of the plurality of terms and a digital document of the plurality of digital documents, and
    the term-document correlation indicator for a particular term and a particular digital document describes a term-document correlation ratio of significance of the particular term to the particular digital document and significance of the particular term to other digital documents among the plurality of digital documents.

4. The computer-implemented method of claim 1, wherein:
    the plurality of inferred document-sentiment data objects further comprises a topic-sentiment correlation data object,
    the topic-sentiment correlation data object comprises a plurality of term-sentiment correlation indicators, and
    the plurality of topic-sentiment correlation indicators describes relationships between the plurality of topics and the plurality of sentiments.

5. The computer-implemented method of claim 4, wherein:
    the plurality of topic-sentiment correlation indicators comprises a topic-sentiment correlation indicator for each topic-sentiment pair associated with a term of the plurality of topics and a sentiment of the plurality of sentiments,
    the topic-sentiment correlation indicator for a particular topic and a particular sentiment describes topic-sentiment correlation ratio of significance of the particular topic to the particular sentiment and significance of the particular topic to other sentiments among the plurality of sentiments.

6. The computer-implemented method of claim 1, wherein:
    the plurality of inferred document-sentiment data objects further comprises a prior sentiment label data object,
    the prior sentiment label data object comprises one or more prior sentiment labels,
    the plurality of digital documents comprises one or more labeled documents, and
    each labeled document of the one or more labeled documents is associated with a corresponding prior sentiment label of the one or more prior sentiment labels.

7. The computer-implemented method of claim 6, wherein each of the one or more prior sentiment labels is determined by processing the corresponding labeled document for the prior sentiment label using an initial sentiment detection routine.

8. The computer-implemented method of claim 1, wherein each of the one or more prior sentiment labels is determined based at least in part on ground-truth associated with the one or more labeled documents.

9. The computer-implemented method of claim 1, wherein:
the plurality of digital documents comprises one or more unlabeled documents, and
the sentiment detection for the plurality of digital documents comprises an individual sentiment detection for each unlabeled document of the one or more unlabeled documents.

10. The computer-implemented method of claim 1, wherein:
the plurality of digital documents comprises one or more labeled documents, and
the sentiment detection for the plurality of digital documents comprises an updated sentiment detection for each labeled document of the one or more labeled documents.

11. The computer-implemented method of claim 1, wherein the topic detection for the plurality of digital documents comprises an individual topic detection for each digital document of the plurality of digital documents.

12. The computer-implemented method of claim 1, wherein (1) the term-topic factorization is a first non-negative matrix factorization and (2) the document-topic factorization is a second non-negative matrix factorization.

13. The computer-implemented method of claim 1, wherein:
the plurality of document-sentiment objects comprises multiple document-sentiment data objects, and
the document-sentiment factorization is a first non-negative matrix tri-factorization.

14. The computer-implemented method of claim 1, further comprising:
detecting, based at least in part on the topic detection and the sentiment detection, one or more critical topic detections; and
generating operational metrics based at least in part on the one or more critical topic detections.

15. An apparatus comprising at least one processor and at least one non-transitory memory comprising program code, wherein the at least one non-transitory memory and the program code are configured to, with the at least one processor, cause the apparatus to:
obtain a term correlation data object for a plurality of digital documents, wherein: (1) the term correlation data object comprises a plurality of term correlation indicators for a plurality of terms, and (2) the plurality of term correlation indicators describes co-occurrences of the plurality of terms in the plurality of digital documents;
determine, based at least in part on the term correlation data object, a term-topic correlation data object for the plurality of digital documents, wherein: (1) the term-topic correlation data object comprises a plurality of term-topic correlation indicators, (2) the plurality of term-topic correlation indicators describes relationships between the plurality of terms and a plurality of topics, (3) the term-topic correlation data object is determined by a term-topic factorization of the term correlation data object into a plurality of inferred term-topic data objects, and (4) the plurality of inferred term-topic data objects comprises the term-topic correlation data object;
determine, based at least in part on the term-topic correlation data object, a document-topic correlation data object for the plurality of digital documents, wherein:
(1) the document-topic correlation data object comprises a plurality of document-topic correlation indicators, (2) the plurality of digital document topic correlation indicators describes relationships between the plurality of digital documents and a plurality of topics, (3) the document-topic correlation data object is determined by a document-topic factorization of a source term-document data object into a plurality of inferred document-topic data objects, and (4) the plurality of inferred document-topic data objects comprises the document-topic correlation data object;
determine, based at least in part on the term-topic correlation data object, a document-sentiment correlation data object for the plurality of digital documents, wherein: (1) the document-sentiment correlation data object comprises a plurality of document-sentiment correlation indicators, (2) the plurality of digital documents-sentiment correlation indicators describes relationships between the plurality of digital documents and a plurality of sentiments, (3) the document-topic correlation data object is determined by a document-sentiment factorization of a source document-sentiment data object into a plurality of inferred document-sentiment data objects, and (4) the plurality of inferred document-topic data objects comprises the document-sentiment correlation data object;
generate the topic detection based at least in part on the document-topic correlation object; and
generate the sentiment detection based at least in part on the document-sentiment correlation object.

16. The apparatus of claim 15, wherein:
the plurality of inferred document-sentiment data objects further comprises a topic-sentiment correlation data object,
the topic-sentiment correlation data object comprises a plurality of topic-sentiment correlation indicators, and
the plurality of topic-sentiment correlation indicators describes relationships between the plurality of terms and the plurality of sentiments.

17. The apparatus of claim 15, wherein:
the plurality of inferred document-sentiment data objects further comprises a prior sentiment label data object,
the prior sentiment label data object comprises one or more prior sentiment labels,
the plurality of digital documents comprises one or more labeled documents, and
each labeled document of the one or more labeled documents is associated with a corresponding prior sentiment label of the one or more prior sentiment labels.

18. The apparatus of claim 15, wherein each of the one or more prior sentiment labels is determined based at least in part on ground-truth associated with the one or more labeled documents.

19. A non-transitory computer storage medium comprising instructions configured to cause one or more processors to at least at least perform:
obtain a term correlation data object for a plurality of digital documents, wherein: (1) the term correlation data object comprises a plurality of term correlation indicators for a plurality of terms, and (2) the plurality of term correlation indicators describe co-occurrences of the plurality of terms in the plurality of digital documents;
determine, based at least in part on the term correlation data object, a term-topic correlation data object for the plurality of digital documents, wherein: (1) the term-topic correlation data object comprises a plurality of term-topic correlation indicators, (2) the plurality of term-topic correlation indicators describes relationships between the plurality of terms and a plurality of topics, (3) the term-topic correlation data object is determined by a term-topic factorization of the term correlation data object into a plurality of inferred term-topic data objects, and (4) the plurality of inferred term-topic data objects comprises the term-topic correlation data object;

determine, based at least in part on the term-topic correlation data object, a document-topic correlation data object for the plurality of digital documents, wherein: (1) the document-topic correlation data object comprises a plurality of document-topic correlation indicators, (2) the plurality of digital document topic correlation indicators describes relationships between the plurality of digital documents and a plurality of topics, (3) the document-topic correlation data object is determined by a document-topic factorization of a source term-document data object into a plurality of inferred document-topic data objects, and (4) the plurality of inferred document-topic data objects comprises the document-topic correlation data object;

determine, based at least in part on the term-topic correlation data object, a document-sentiment correlation data object for the plurality of digital documents, wherein: (1) the document-sentiment correlation data object comprises a plurality of document-sentiment correlation indicators, (2) the plurality of digital documents-sentiment correlation indicators describe relationships between the plurality of digital documents and a plurality of sentiments, (3) the term-document correlation data object is determined by a document-sentiment factorization of a source document-sentiment data object into a plurality of inferred document-sentiment data objects, and (4) the plurality of inferred document-topic data objects comprises the document-sentiment correlation data object;

generate the topic detection based at least in part on the document-topic correlation object; and generate the sentiment detection based at least in part on the document-sentiment correlation object.

20. The non-transitory computer storage medium of claim 19, wherein:
the plurality of inferred document-sentiment data objects further comprises a topic-sentiment correlation data object,
the topic-sentiment correlation data object comprises a plurality of topic-sentiment correlation indicators, and
the plurality of topic-sentiment correlation indicators describes relationships between the plurality of topics and the plurality of sentiments.

* * * * *

UNITED STATES PATENT AND TRADEMARK OFFICE
CERTIFICATE OF CORRECTION

PATENT NO. : 11,120,229 B2
APPLICATION NO. : 16/560304
DATED : September 14, 2021
INVENTOR(S) : Roy et al.

Page 1 of 1

It is certified that error appears in the above-identified patent and that said Letters Patent is hereby corrected as shown below:

In the Claims

Column 23
Line 40, "document topic" should read --document-topic--
Line 56, "describe" should read --describes--

Column 26
Line 3, "document topic" should read --document-topic--
Line 61, "describe" should read --describes--

Column 27
Line 15, "document topic" should read --document-topic--

Column 28
Line 3, "describe" should read --describes--

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*